(12) United States Patent
Whitham

(10) Patent No.: US 7,136,819 B2
(45) Date of Patent: Nov. 14, 2006

(54) INTERACTIVE MULTIMEDIA BOOK

(76) Inventor: Charles Lamont Whitham, 11507 Purple Beech Dr., Reston, VA (US) 20191-1327

( * ) Notice: Subject to any disclaimer, the term of this patent is extended or adjusted under 35 U.S.C. 154(b) by 567 days.

(21) Appl. No.: 10/724,228

(22) Filed: Dec. 1, 2003

(65) Prior Publication Data

US 2004/0111270 A1    Jun. 10, 2004

Related U.S. Application Data

(63) Continuation of application No. 09/754,053, filed on Jan. 5, 2001, now Pat. No. 6,728,681.

(51) Int. Cl.
*G10L 21/00* (2006.01)

(52) U.S. Cl. ............... 704/275; 704/231; 704/251; 704/270.1; 715/532; 715/501.1; 709/218

(58) Field of Classification Search .......... None
See application file for complete search history.

(56) References Cited

U.S. PATENT DOCUMENTS

| | | | | |
|---|---|---|---|---|
| 5,697,793 A * | 12/1997 | Huffman et al. | ............ | 434/317 |
| 5,727,129 A * | 3/1998 | Barrett et al. | ................. | 706/10 |
| 5,774,628 A * | 6/1998 | Hemphill | .................... | 704/255 |
| 5,822,720 A * | 10/1998 | Bookman et al. | .............. | 704/3 |
| 5,890,123 A * | 3/1999 | Brown et al. | ............ | 704/270.1 |
| 5,890,172 A * | 3/1999 | Borman et al. | .......... | 715/501.1 |
| 5,893,132 A * | 4/1999 | Huffman et al. | ............ | 715/532 |
| 5,953,392 A * | 9/1999 | Rhie et al. | ............... | 379/88.13 |
| 6,023,701 A * | 2/2000 | Malik et al. | .................. | 707/10 |
| 6,026,410 A * | 2/2000 | Allen et al. | .............. | 707/104.1 |
| 6,085,161 A * | 7/2000 | MacKenty et al. | ......... | 704/270 |
| 6,088,675 A * | 7/2000 | MacKenty et al. | ......... | 704/270 |
| 6,101,472 A * | 8/2000 | Giangarra et al. | .......... | 704/275 |
| 6,112,176 A * | 8/2000 | Goldenthal et al. | ......... | 704/257 |
| 6,175,862 B1 * | 1/2001 | Chen et al. | ................. | 709/218 |
| 6,460,036 B1 * | 10/2002 | Herz | .......................... | 707/10 |
| 6,526,351 B1 * | 2/2003 | Whitham | .................... | 701/211 |
| 6,829,603 B1 * | 12/2004 | Chai et al. | ..................... | 707/5 |

* cited by examiner

*Primary Examiner*—Vijay Chawan
(74) *Attorney, Agent, or Firm*—Whitham, Curtis, Christofferson & Cook,PC

(57) ABSTRACT

An interactive multimedia book provides hands-on multimedia instruction to the user in response to voiced commands. The book is implemented on a computer system and includes both text and audio/video clips. The interactive multimedia book is accessed by voiced commands and natural language queries as the primary user input. The displayed text is written in a markup language and contains hyperlinks which link the current topic with other related topics. The user may command the book to read the text and, as the text is read by the voice synthesizer, a word which is also a hyperlink will change its attributes upon being spoken. The user will be able to observe or hear this and simply utter the word which is the hyperlink to navigate to the linked topic.

11 Claims, 22 Drawing Sheets

INTERACTIVE MULTIMEDIA BOOK

CROSS REFERENCE TO RELATED APPLICATION

This application is a continuation of U.S. patent application Ser. No. 09/754,053 filed Jan. 5, 2001 now U.S. Pat. No. 6,728,681, by Charles Lamont Whitham for "Interactive Multimedia Book".

BACKGROUND OF THE INVENTION

1. Field of the Invention

This invention generally relates to the field of electronic publishing, and more particularly to an interactive multimedia book useful in providing a user with hands-on multimedia instructions in response to voiced commands.

2. Description of the Prior Art

Books which provide instruction in various arts, ranging from gardening to cooking to woodworking, are especially popular, as may be readily seen by the number of shelves devoted to them in major bookstores. Generally speaking, however, these books are intended to be read at one location, and then the knowledge gained from them applied in another location. Take for example a cookbook. There may be sections of the cookbook which provide instruction on various cooking techniques and other sections which set out the recipes. The user of the cookbook is typically not able to read the book on topics of technique instruction while attempting to cook. It is more a matter of reading and then attempting to execute based on the instructions read. More commonly, a cookbook will be laid open in the kitchen at the place of a recipe to allow the user to make more or less frequent reference to the ingredients and quantities. For this purpose, there are number of devices currently sold in kitchen supply stores which hold a cookbook at an easy to read angle with a transparent plastic cover so as to protect the open pages of the cookbook from splatters. These devices make it difficult to page back and forth in the cookbook, but generally the desired recipe is on a single page.

The ease of use of other types of instructional books is also a problem. A gardening book is typically not found in the environment it describes; that is, in the garden or the potting shed. The book is simply too valuable to the user to be ruined by soil and water and, in any case, the book is not easily used when one is wearing gardening gloves and handling a spade or trowel. The same is true of woodworking books. In the environment of the wood shop, there are many potentially dangerous tools requiring the full attention of the user. One cannot safely operate a radial arm saw while looking at the illustrations in a book.

There are many other instructional books which have the same problems. Many of these are in the nature of do-it-yourself (DIY) repair and maintenance books, such as home repair and automobile repair and maintenance books. Consider for example the problem of replacing an electrical switch in the home. To someone familiar with the procedure, it is quite simple; however, to the new homeowner, even the simplest home wiring problem can be quite mysterious. And sometimes just reading a book on the procedure does not always provide that sufficient degree of confidence that would allow the homeowner to confidently and competently complete the procedure. As to automobile repair and maintenance, which at one time was the avocation of many young American males, this is not something attempted much nowadays simply because the modern automobile has become such a complex machine. Yet, there are many things the average car owner can do on their own provided they had the right instruction. But a book is not always a good substitute for personal instruction.

SUMMARY OF THE INVENTION

It is therefore an object of the present invention to provide a book which provides the user with instruction in a safe and effective manner in a variety of environments.

It is another and more specific object of the invention to provide an interactive multimedia book which provides hands-on multimedia instruction to the user in response to voiced commands.

It is a further object of the invention to provide an easy to use computer system on which the interactive multimedia book may be implemented and which is suitable to various environments in which the book might be used.

According to the invention, the interactive multimedia book is published on a computer readable medium with the necessary software to support the interactive operation of the book. Alternatively, the book may be downloaded from a remote site using a network, such as the Internet, in which case the content of the book and the necessary software are copied to a local medium, such as a computer hard disk. In a preferred embodiment, the book may be published in the form of a compact disk (CD), digital versatile disk (DVD) or other computer readable medium containing both the content of the book and the necessary software. The content includes both text and audio/video clips.

The interactive multimedia book is accessed by a computer system which is equipped with a microphone and voice recognition software. Voiced commands and natural language queries are the primary user input to the computer system, but conventional inputs, such as the usual keyboard and mouse, can also be provided for user input. The computer system is also equipped with a high resolution display, a voice synthesizer with a text-to-speech module, and a speaker or headphone system to provide the output to the user. A combination headphone and directional microphone can be especially convenient in some environments as, for example, the wood shop where the headphones allow the user to better hear the instruction over the din of machine noise while at the same time protecting the user's hearing. Optionally, the computer system may be equipped with a printer to provide the user with a hard copy output of specific content.

In operation, when the computer system is initially turned on, a determination is made as to whether the user has inserted a CD or DVD containing an interactive multimedia book or if such a book or books are stored on the hard disk of the computer system. The user is given the option of selecting and playing an interactive multimedia book. Once the process of playing the interactive multimedia book begins, the user selects a specific topic or project in the book by any one of several input options, including speaking the topic or project name or speaking a natural language query. Responding to the command or natural language query, the computer system accesses the desired topic or project and displays text and optionally an image relevant to the topic or project. The displayed text is written in a markup language, such as HyperText Markup Language (HTML), and contains hyperlinks which link the current topic with other related topics. These hyperlinks have some attribute, such as color, which changes when a pointing cursor is placed on them, as is well known in the art. However, in the preferred embodiment of the invention, the user may command the book to read the text by, for example, the spoken command "READ". As the text is read by the text-to-speech module of the voice synthesizer, a word which is also a hyperlink will change its visual attribute upon being spoken, just as if the pointing cursor had been placed on the word, and activate an aural attribute, such as a bell or chime. The user will be able to observe or hear this and, without having to click a mouse button, simply utter the word which is the hyperlink to navigate to the linked topic.

To facilitate the interactive operation of the book, the voice recognition system is provided with a limited vocabulary of commands. These include, among others, the command "READ" already mentioned. Other commands include "CONTENTS", which causes the contents of the book to be displayed, "VIDEO", which selects a video clip indicated by a displayed icon, and "PLAY", which plays the selected video clip. A word which is a hyperlink also functions as a command causing the linked topic to be accessed. To return, to the preceding text, the user speaks the command "RETURN", this command functioning much the same way as the "BACK ARROW" does in a browser on the World Wide Web (WWW). The number of commands is purposely kept relatively small to minimize or eliminate the training time required for most voice recognition systems, thereby making the interactive multimedia book readily useful to the widest audience.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

The basic invention may be implemented on any personal computer (PC) system having sufficient memory, hard disk space and processor speed and having the requisite speech synthesis and voice recognition hardware and software applications to support the invention. Obviously, for many uses of the interactive multimedia book of this invention, a portable computer would be desired, but not necessary. For example, if the kitchen has a desk and work space equipped with a desktop computer, then a cookbook version of the invention might be conveniently installed on that computer. However, in a preferred implementation of the invention, a computer system with a simplified user interface which may be positioned near the user's work area or mounted under a cabinet is preferred.

Figure 1:
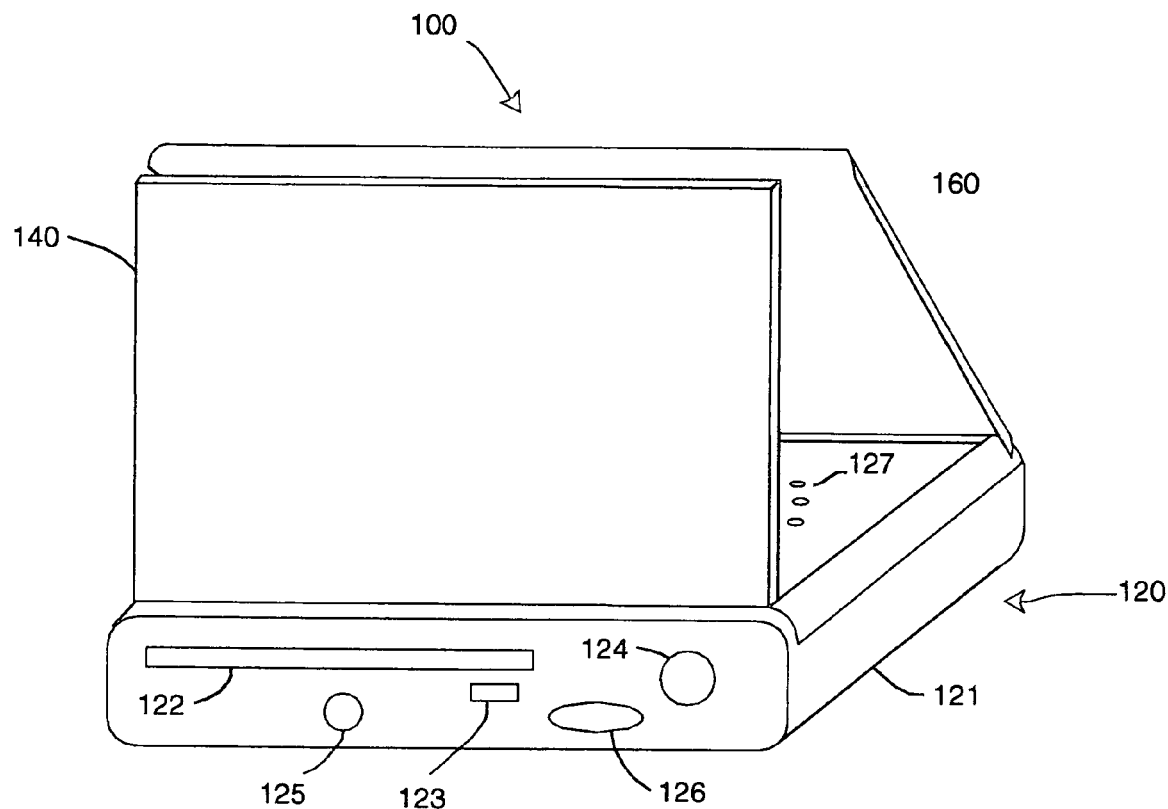
FIG. 1 is an isometric diagram of a computer system on which the interactive multimedia book may be implemented.

Referring now to the drawings, and more particularly to FIG. 1, there is shown an isometric view of a preferred computer system 100 on which the invention may be implemented. The system unit 120 includes the central processor unit (CPU) and supporting electronics of the computer system 100 which are housed in a low profile, generally rectangular housing 121. Attached to the housing 121 is a display screen 140, such as a liquid crystal display (LCD), hinged to a front edge of the housing 121 and which, when folded flat against the housing 121, may be covered by protective cover 160, hinged to a rear edge of the housing 121. In the preferred embodiment of the invention, the act of opening or of closing the protective cover 160 toggles a switch which initiates turn on or turn off of the computer system. Alternatively, and if the protective cover 160 is omitted, the switch can be toggled on by the rotation of the display screen 140 away from the housing 121 or toggled off by folding the display screen 140 flat against the housing 121.

The front face of the housing 121 has a slot 122 for receiving a compact disk (CD) or digital versatile disk (DVD). The CD or DVD inserted into the slot 122 is automatically transported into a CD/DVD player. An eject button 123 is provided for ejecting the CD or DVD. The only other user operable device on the front face of the housing 121 is a PAUSE/SELECT button 124, preferably a membrane switch and which, by means of single and double clicks similar to those used on a mouse button, is used to control certain processes of the application program. This button is also used for cursor movement and selection functions during other processes of the application program. Due to the voice command features of the invention, the button 124 is the only user interface normally needed; however, for more flexible user interface, particularly with applications other than the present invention, a conventional keyboard and mouse (not shown) may be used. Preferably, a wireless keyboard and mouse using, for example, an infrared (IR) link would be used to avoid clutter in the work area. For this purpose, an IR transceiver port 125 is provided. Also, a microphone 126 is located on the front face of the housing 121, and a speaker 127 is located on the surface of the housing 121 against which the display 140 is folded.

Figure 2:
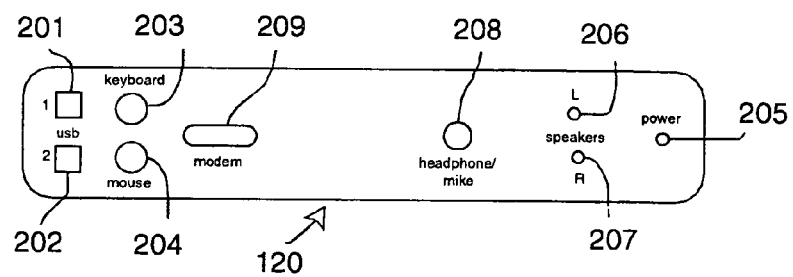
FIG. 2 is a back view of the computer system shown in FIG. 1 illustrating the connectors for connections to external devices.

FIG. 2 illustrates the back of the housing 121 to show the various connectors for making connections to external devices. These include two universal serial bus (USB) ports 201 and 202, to which may be connected a variety of devices including, for example, a printer, a personal digital assistant (PDA), an external storage device, and the like. Additionally, there are provided PS/2 connectors 203 and 204 for a conventional keyboard and mouse (not shown) which may be used in the alternative to a wireless keyboard and mouse. A power supply jack 205 is adapted to receive power input from a conventional AC/DC power converter (not shown). Since the computer system may be used for other applications including the playing of music recorded on CD and movies recorded on DVD, a pair of stereo speaker jacks 206 and 207 are provided to connect to optional external speakers. A headphone and microphone set transceiver jack 208 is provided for use with the optional headphone and microphone set shown in FIG. 4. When this jack 208 is in use, the internal microphone 126 and speaker 127, shown in FIG. 1, and the stereo speaker jacks 206 and 207 are disabled. Finally, a modem output jack 209 is provided for optional connection to the Internet.

Figure 3:
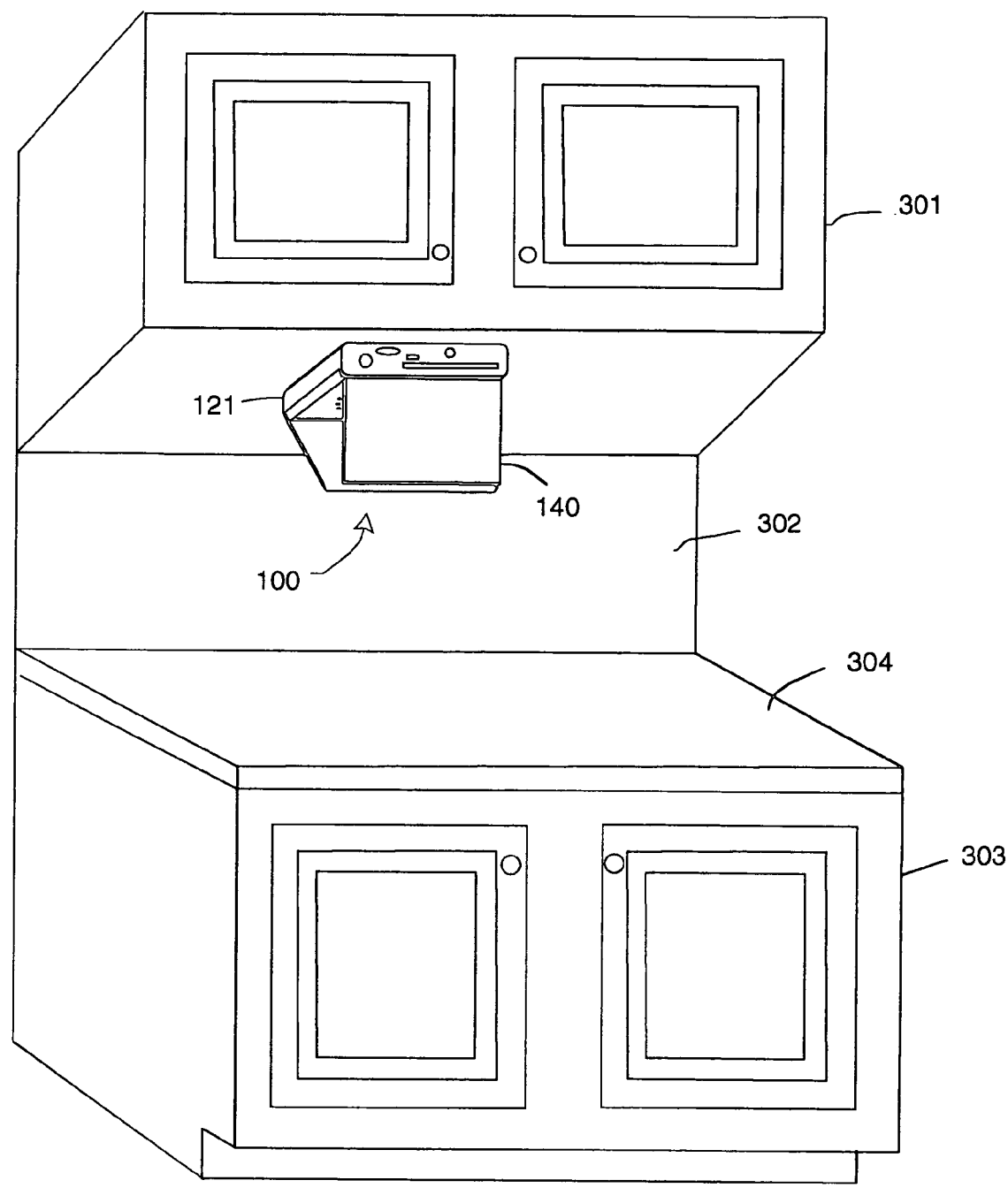
FIG. 3 is a pictorial illustration of the computer system of FIG. 1 mounted under a wall cabinet.

FIG. 3 shows a wall cabinet 301 mounted on a wall 302 over a base cabinet 303 having a counter top 304, such as would be found in a typical kitchen, for example. The counter top 304, or other work surface, is a convenient location for placing the computer system, since it is close to where the work is being performed by the user. The disadvantage of this, however, is that the computer system takes up valuable working area and could get in the way of some procedures. In FIG. 3, the computer system 100 of FIG. 1 mounted under a wall cabinet 301, freeing up valuable work space. At the same time, the computer system is handy to the user and its screen is easy to view. The installation of the computer system to the underside of the wall cabinet 301 may be made by means of slotted holes in the bottom of the housing 121 which capture bolt heads projecting down through the cabinet base or, in the alternative, by means of machine nuts molded into the bottom of the housing 121 into which bolts projecting down through the cabinet base are threaded. Other ways of mounting the computer system to the bottom of the wall cabinet 301, shelf or wall bracket can also be employed. When the computer system 100 is mounted to the bottom of the wall cabinet 301, the display screen 140 is rotated downwardly from the housing 121. Note that in this configuration, the computer system is "upside down" compared to its position in FIG. 1. This would ordinarily mean that the image on display screen 140 would be upside down; however, the computer system includes a built in gravity switch which is checked each time the computer system is turned on to determine the orientation of the computer system and then display the image on the display screen 140 with the proper rotation for that orientation. This gravity switch and the operation will be described in more detail with reference to FIGS. 5 and 6A.

Figure 4:
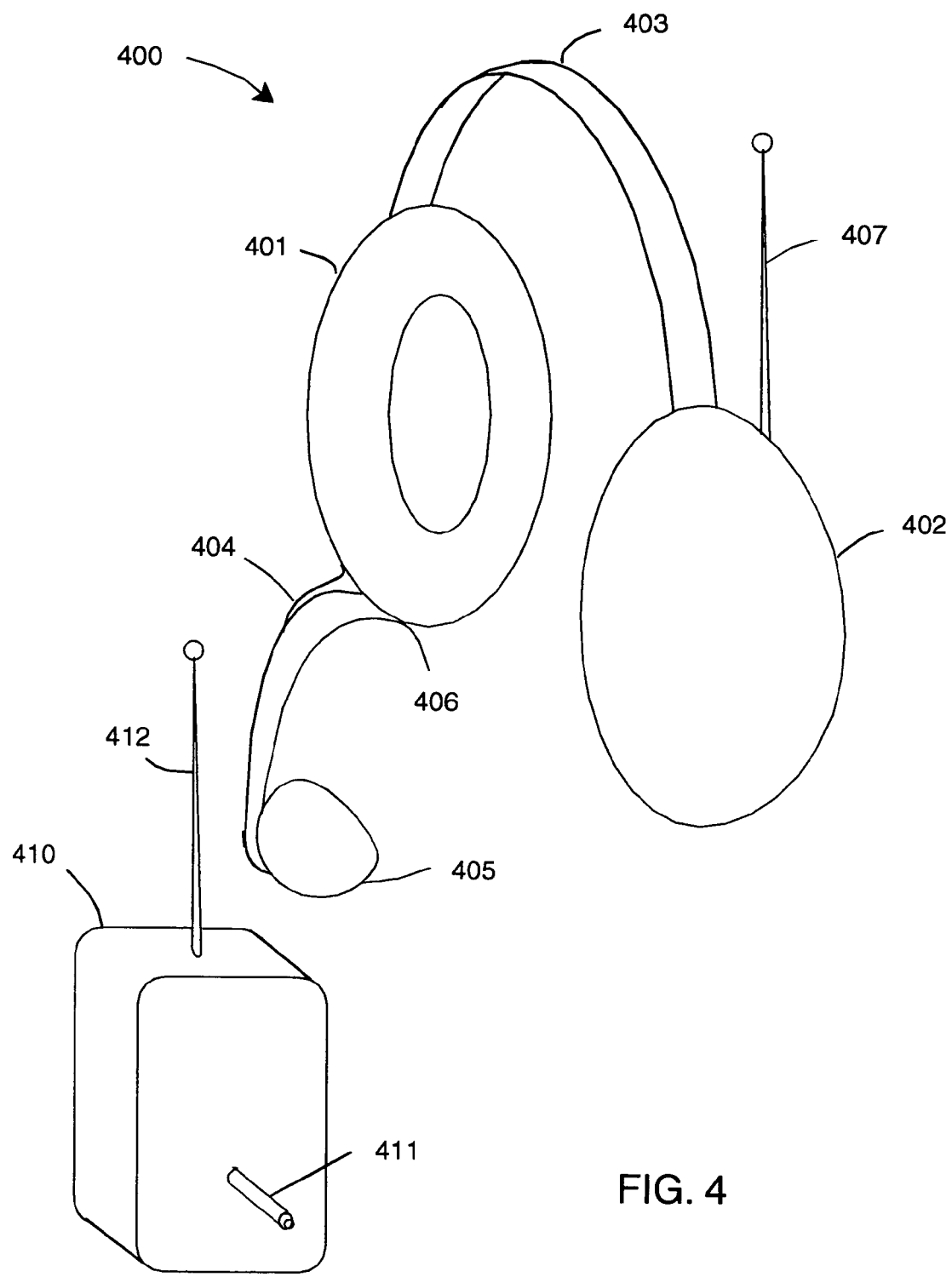
FIG. 4 is a pictorial illustration of a wireless headphone and microphone set which may be optionally used with the computer system shown in FIG. 1.

The optional headphone and microphone set 400 is shown in FIG. 4. This set comprises a pair of headphones 401 and 402 connected by an adjustable head strap 403 to allow convenient and comfortable fit to the user. Attached to one of the headphones, headphone 401 in the figure, is a microphone support 404 and a microphone 405. The microphone support 404 is adjustable about pivot point 406 so that the microphone 405 may be positioned immediately adjacent the user's mouth.

The headphone and microphone set 400 communicates with the computer system 100 through a wireless radio frequency (RF) link. The RF link can be based, for example, on the Bluetooth standard. An RF transceiver is built into one of the headphones, headphone 402 in the figure, and provided with an antenna 407. A communicating RF transceiver 410 plugs into the back of the computer system main body 121 at jack 208 shown in FIG. 2 by means of plug 411. An antenna 412 is used for transmitting speech synthesized signals to the headphone and microphone set 400 and for receiving voice command signals from the headphone and microphone set 400.

It is contemplated that most applications will not require the optional headphone and microphone set 400; however, the headphone and microphone set 400 would be desirable when working in a high ambient noise area, such as a woodworking shop or performing maintenance and repair on an automobile. Wearing the headphones additionally provides some hearing protection.

Figure 5:
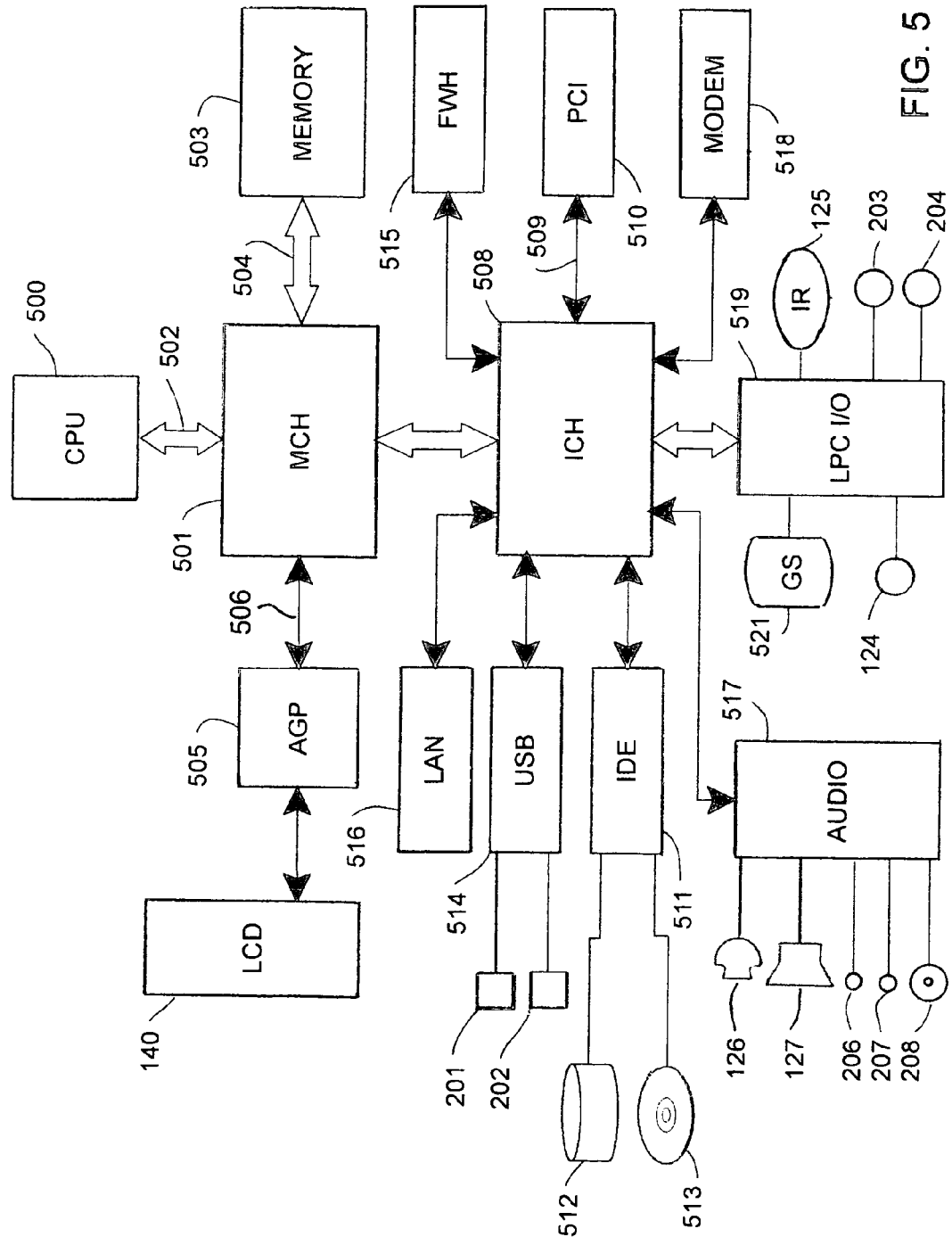
FIG. 5 is a block diagram of the computer system shown in FIG. 1.

FIG. 5 is a block diagram of a computer system architecture on which the interactive multimedia book may be implemented. The computer system includes a central processor unit (CPU) 500 connected to a memory controller hub (MCH) 501 via a system bus 502. The MCH 501 is connected to a random access memory (RAM) 503 via a direct memory bus 504 and a video graphics chip 505, such as the accelerated graphics port (AGP) graphics chip, via a video bus 506. The display screen 140 is connected to the AGP graphics chip 505.

The MCH 501 is further connected via high speed interface 507 to an input/output (I/O) controller hub (ICH) 508. The ICH 508 provides connection to a personal computer interface (PCI) bus 509, to which is attached one or more PCI slots 510 for option cards, an integrated device electronics (IDE) controller interface 511, to which a hard drive 512 and a removable media drive 513, such as a CD/DVD drive, are attached, a USB controller 514 connecting to the USB ports 201 and 202 (FIG. 2), and a firmware hub (FWH) 515. Operating system (OS) software is installed on the hard drive 512. Voice recognition and speech synthesis software are also installed on the hard drive 512. The ICH 508 integrates a local phone network port and an Ethernet network port in local area network (LAN) connection 516. The ICH 508 also provides an interface to a multiple channel audio interface 517, to which microphone 126 and speaker 127 (FIG. 1) and stereo speaker jacks 206 and 207 and headphone and microphone set jack 208 (FIG. 2) are connected. The ICH 508 interfaces with a modem 518 for optional connection to the Internet.

The voice recognition software is the primary user input to the system. If the interactive multimedia book is distributed on removable media such as a CD or DVD, the supporting software is first installed on the hard drive 512 and the content read from the removable media. In the alternative, the interactive multimedia book may be down loaded from the Internet and stored on the hard drive 512. It is possible, for example, for the hard drive to store multiple interactive multimedia books, and the computer system would be a repository or library of books.

The ICH 508 also provides a low pin count (LPC) interface to a super I/O device 519 supporting a keyboard, mouse, floppy disk drive, and parallel and serial ports. In the preferred embodiment, only the keyboard and mouse support are utilized, either through the IR transceiver 125 (FIG. 1) or the PS/2 ports 203 and 204 (FIG. 2). In addition, the LPC I/O device 519 provides the interface for the membrane switch 124 (FIG. 1).

As mentioned, there is a gravity switch 521 which is connected to the LPC I/O device 519. The gravity switch 521 is checked by the CPU 500 as part of the initial program load (IPL) to determine the orientation of the computer system. The gravity switch may be, for example, a mercury switch having a central contact and contacts at either end of a bulb and which is oriented perpendicular to the horizontal plane of the main body 121 of the computer system. Based on the sensed output of the gravity switch 521, the CPU 500 rotates the image on the display screen 140 so that the image is displayed right side up to the viewer.

Figure 6A:
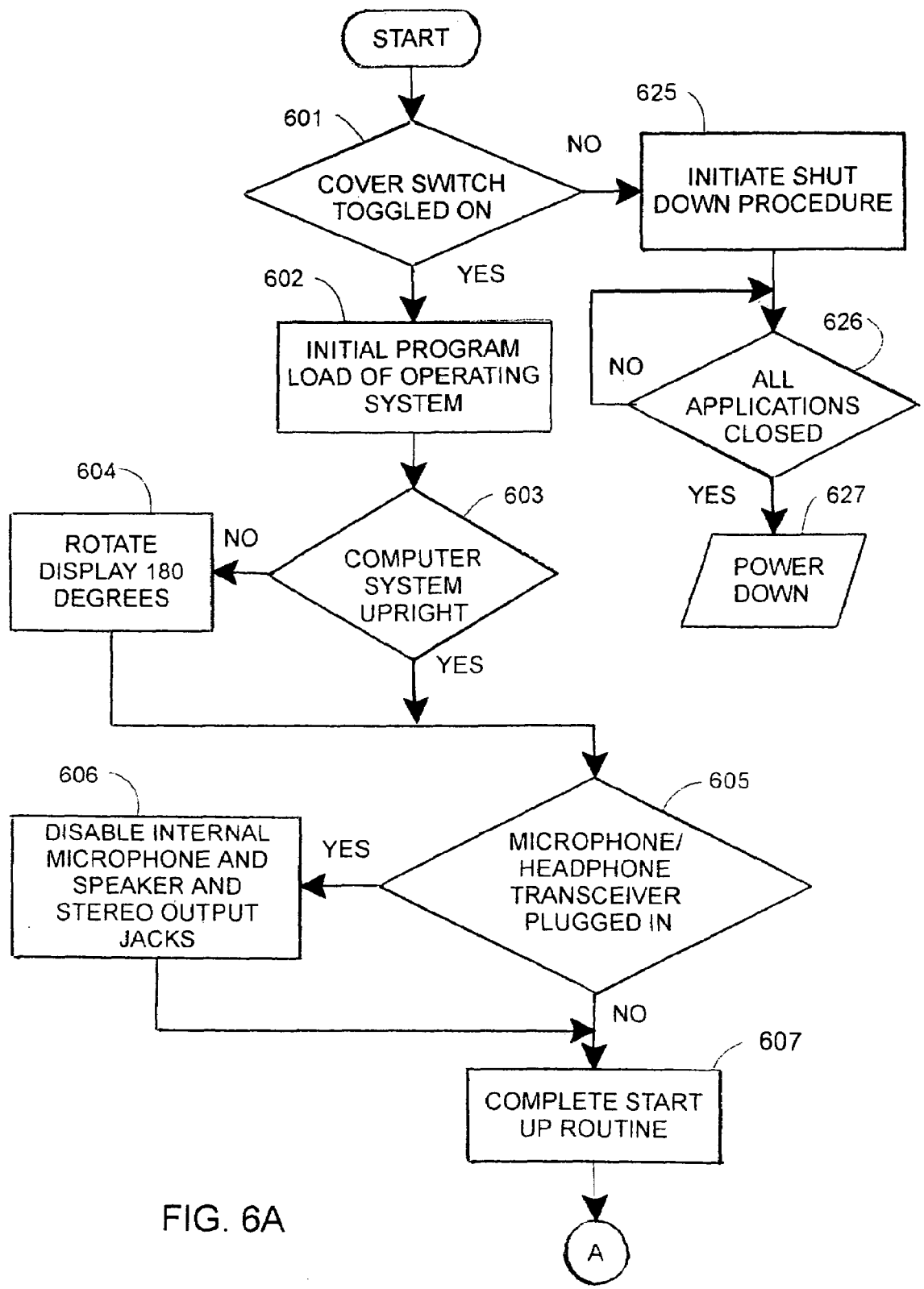
FIGS. 6A, 6B and 6C, taken together, are a flow diagram illustrating modifications to the basic operating system of the computer system shown in FIG. 1 including the automatic on and off function, the video orientation function and inhibition of the internal microphone and speaker when the wireless headphone and microphone transceiver is installed.
Figure 6B:
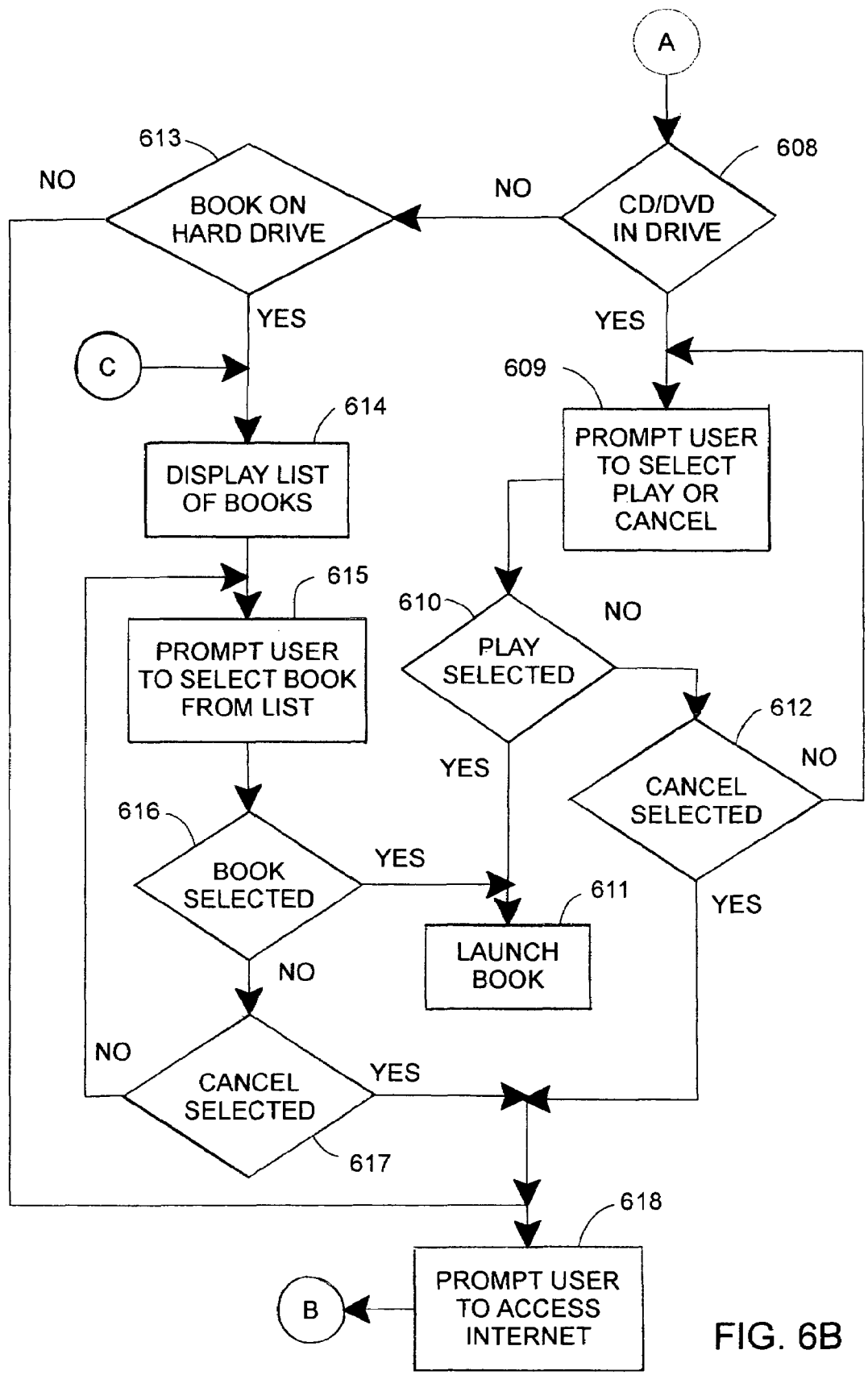
Figure 6C:
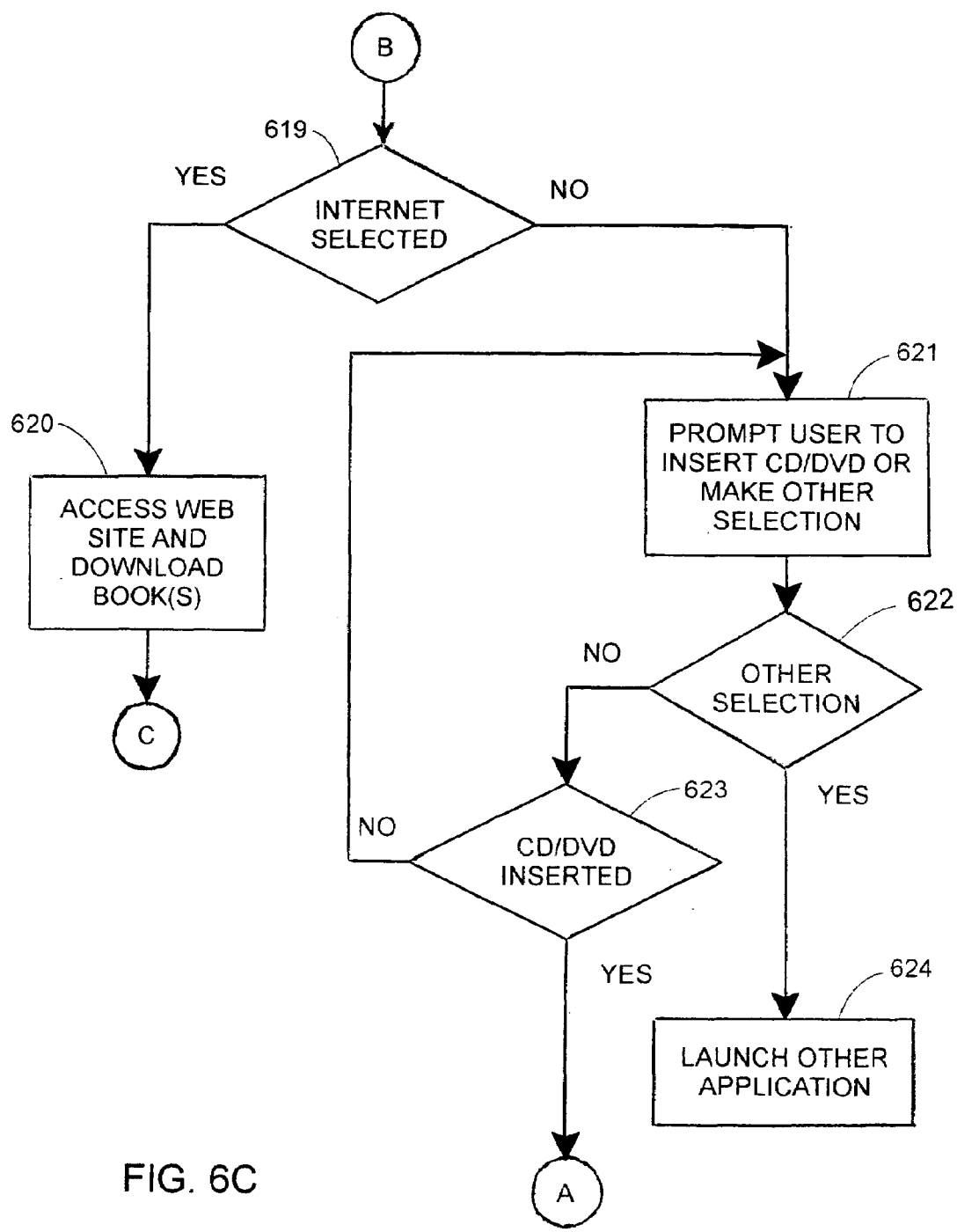

FIGS. 6A to 6C are a flow diagram illustrating modifications to the basic operating system (OS) of the computer system. These modifications include an automatic on and off function and detection of the orientation of the computer so that the image on the display screen is property displayed. The modifications also include inhibiting the internal microphone and speaker and stereo output jacks when the wireless headphone and microphone transceiver is installed.

Referring first to FIG. 6A, a determination is made in decision block 601 as to whether the cover switch has been toggled, indicating that the cover has been opened or closed. If the cover has been opened, indicating that the user desires to turn on the computer system, then the normal startup routine of the operating system (OS) is initiated in function block 602. As part of that startup routine, a determination is made in decision block 603 as to the orientation of the computer system; that is, is it sitting upright (FIG. 1), say, on a counter top or is it attached below a wall cabinet (FIG. 3). This is done by means of the built-in gravity switch 521. Depending on the orientation of the computer system, the display is either rotated 180° in function block 604 or not, and then the startup routine makes a determination in decision block 605 as to whether the headphone and microphone transceiver 410 (FIG. 4) is plugged into the system unit. If so, the internal microphone and speaker and the stereo speaker jacks are inhibited in function block 606. In either case, the start up routine completes in function block 607.

Referring next to FIG. 6B, upon completion of the startup routine, a determination is made in decision block 608 as to whether a CD or DVD is in the removable media drive 513 (FIG. 5) and, if so, the user is provided with a prompt on the screen as to whether this book is to be played at this time or not in function block 609. This prompt is in the form of buttons which the user can select by a single click of button 124 (FIG. 1) or move between buttons by a double click of button 124, as described in more detail with reference to FIG. 7B, below. Assuming that the user desires to play the book and makes the appropriate selection, as determined in decision block 610, then the program on the removable media is launched in function block 611. On the other hand, should the user elect not to play the book and selects instead a cancel option offered by one of the buttons on the display screen, then the user will be prompted to access the Internet in function block 618.

If there is no CD or DVD in the removable media drive 513, as determined in decision block 608, a determination is made in decision block 613 as to whether one or more books are stored on the hard drive 512 (FIG. 5). If so, a list of books currently stored on the hard drive 512 is displayed in function block 614. Then the user is prompted in function block 615 to select one of the books, again using the single click/double click procedure of button 124. The user is also given the option to cancel in the form of a cancel button. A determination is made in decision block 616 as to whether the user has selected one of the books currently on the hard drive or has selected the cancel button. If a book has been selected, the book is launched in function block 611. If there are no books currently stored on the hard drive 512, as determined in decision block 613, or if the user has selected the cancel button, as determined in decision block 617, then the user is prompted as to whether the Internet should be accessed to down load a book in function block 618. Again the user is prompted by displayed buttons which may be selected by the single click/double click procedure of button 124 in order to access a site on the Internet. The user is also given a cancel button option.

In FIG. 6C, a determination is made in decision block 619 as to whether the user has selected access to the Internet. If so, the desired site on the Internet is accessed and a selected book down loaded in function block 620. Once down loaded, the process loops back to function block 614 (FIG. 6B) where the down loaded book is now displayed for selection by the user. Should the user select the cancel button, as determined in decision block 619, the user is prompted to insert a CD or DVD in the removable media drive 513 or to make a selection of another action in function block 621. If the user does not make another selection, as determined in decision block 622, and instead inserts a CD or DVD, as determined by decision block 623, the process loops back to decision block 608 (FIG. 6B). If the user selects another action, perhaps unrelated to the interactive multimedia book of the present invention, then the application selected is launched in function block 624.

Returning now to FIG. 6A, if in decision block 601 it is determined that the cover has been closed, the shut down procedure is initiated. In this case, any active application is closed in function block 625. Once all active applications have been closed as determined in decision block 626, the computer system is powered down in function block 627.

Figure 7A:
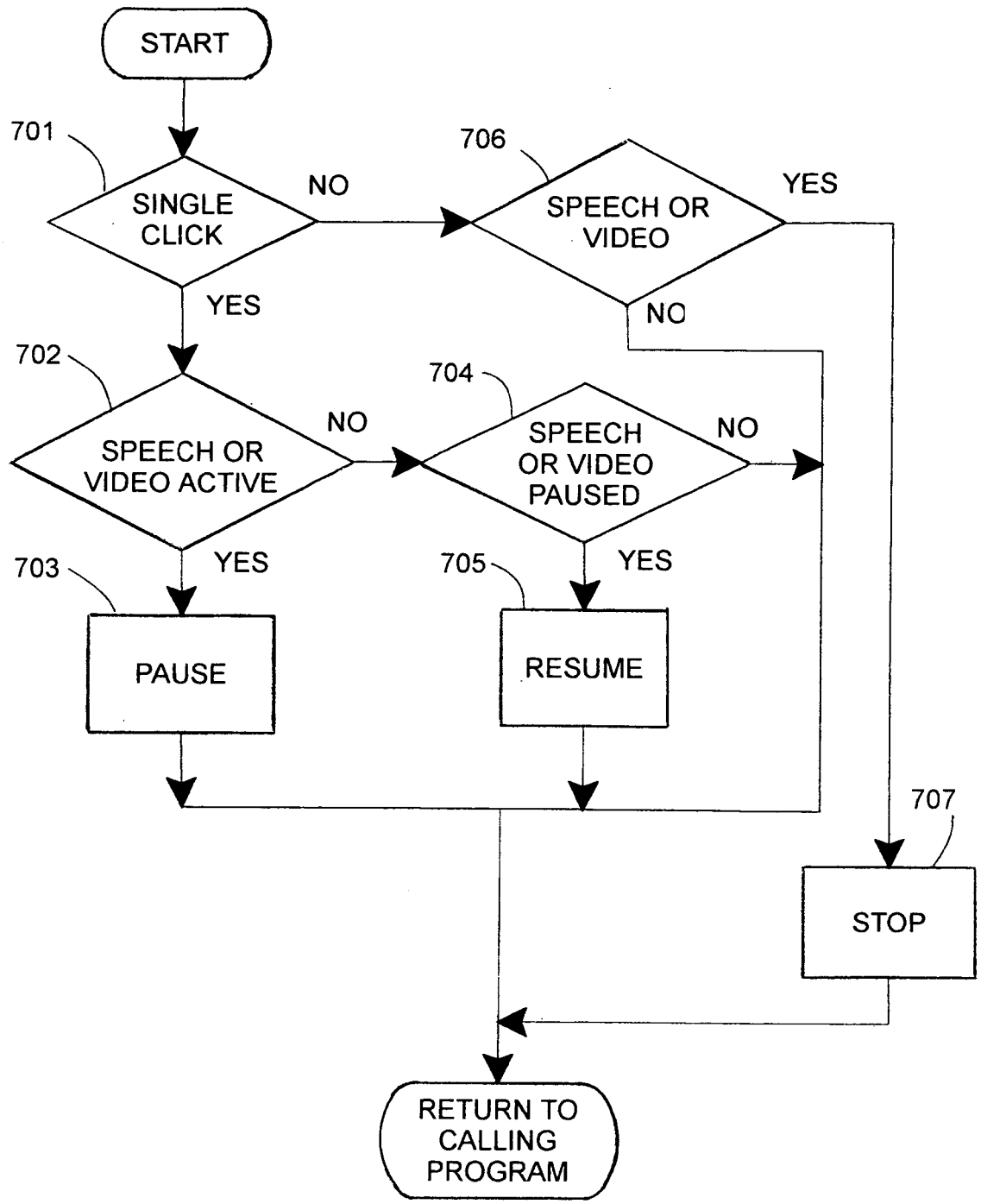
FIGS. 7A and 7B are flow diagrams illustrating the two functions of the pause/select button on the front edge of the computer system of FIG. 1.
Figure 7B:
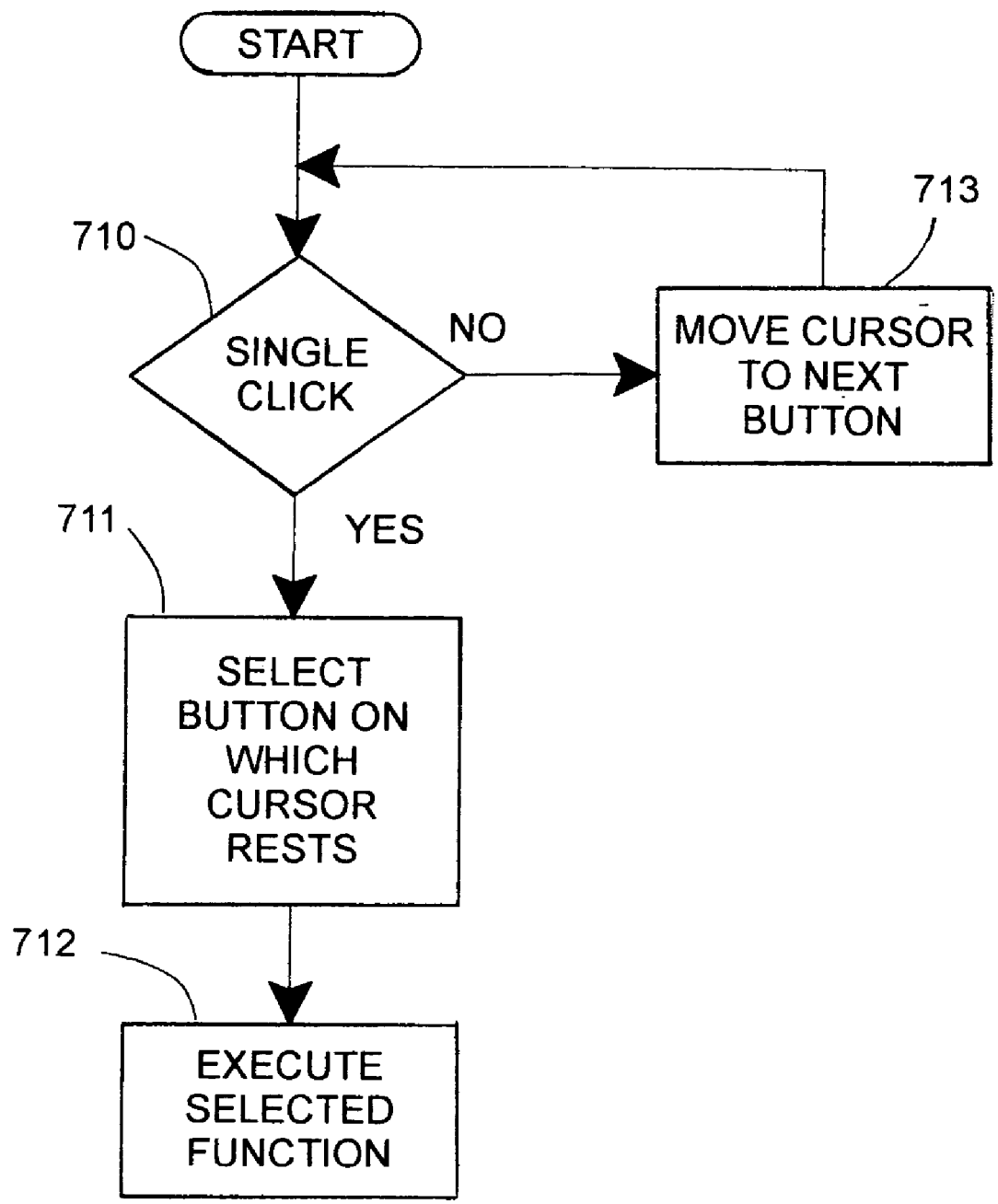

FIGS. 7A and 7B are flow diagrams illustrating the functions of the PAUSE/SELECT button 124. There are two modes of operation illustrated respectively in FIGS. 7A and 7B. The first is to control the reading of text by the text-to-speech module of the speech synthesis function or the playing of a video clip. The second is for cursor movement and selection of buttons displayed on the display screen in lieu of a mouse.

In the first mode of operation of the PAUSE/SELECT button 124 shown in FIG. 7A, a single click of the button 124 functions to pause or resume a function. Therefore, if in decision block 701 a single click is detected, then a further determination is made in decision block 702 as to whether the speech synthesis function is active or a video clip is playing. If so, that speech synthesis function or video clip is paused in function block 703, and the process returns to the calling program. If the speech synthesis function is not active or a video clip is not playing, a determination is made in decision block 704 as to whether there is currently a speech synthesis function or a video clip in the paused condition. If so, the paused speech synthesis function or the paused video clip is resumed from the point at which it was paused in function block 705, and the process returns to the main program; otherwise, the single click of the button 124 is ignored, and the process returns to the main program. If a double click is detected in decision block 701, then a determination is made in decision block 706 as to whether there is either an active or paused speech synthesis function or either a playing or paused video clip. If so, the speech synthesis function or video clip is stopped in function block 707, and the process returns to the main program. If there is no active or paused speech synthesis function or playing or paused video clip, then the double click is ignored. In either case, the process again returns to the main program.

A menu interface may be displayed for some functions not directly involving a specific interactive multimedia book, such as the selection of an interactive multimedia book to play as described with reference to FIGS. 6B and 6C above. In such a case when a mouse is not being used, the button 124 can be used for cursor movement and selection, as shown in FIG. 7B. So for the example described above with reference to FIG. 6B, when the startup procedure has completed and a CD or DVD is in the removable media drive 513, the user is prompted in function block 609 by the display of a first button with the legend "PLAY" and a second button with the legend "CANCEL". The default position of the cursor is on the first, or PLAY, button so that the user can select that button by a single click of the button 124. However, should the user wish to select the CANCEL button, the cursor is moved to that button by a double click of button 124, and then the CANCEL button may be selected by a single click of button 124.

The process is similar to that shown in FIG. 7A and begins by detecting a single click or a double click of button 124 in decision block 710. If a single click, the displayed button on which the cursor rests is selected in function block 711, and the function selected is executed in function block 712. If a double click, the cursor is moved to the next displayed button in function block 713, and the process loops back to decision block 710. This double click operation may be used to move the cursor from one displayed button to another in succession, returning to the original displayed button. In this way, multiple choices (more than two) may be provided to the user.

The procedure just described for cursor movement and selection can be enhanced in the case of a tool bar displayed on the display screen, allowing the user to move from one tool to another by double clicking the button 124. If a particular tool in the tool bar is selected, then a pull down menu is displayed under that tool with the first entry in the menu highlighted. Double clicking on button 124 would highlight successive menu entries, returning to the tool bar and closing the pull down menu. Single clicking on one of the menu entries would launch the displayed function. Obviously, this procedure can be carried further to the case where a menu entry, when selected, results in a fly out menu, again with the first menu entry highlighted, and so on.

FIGS. 8A to 8G, taken together, are a flow diagram illustrating the voice recognition control functions of the interactive multimedia book. During system startup illustrated in FIG. 6A, the voice recognition software is activated. However, in most applications, there is a possible feedback problem if the speech synthesis function is currently active or if a video clip is being played. Therefore, in FIG. 8A, the system checks in decision block 801 to determine if either the speech synthesis function is active or if a video clip is being played. If so, the voice recognition function is inhibited in function block 802, and the process loops back to decision block 801. If, however, neither the speech synthesis function is active or a video clip is being played, then the process goes to decision block 803 where the input is monitored from the microphone to determine if a voice is detected. This monitoring function continues until a voice is detected or until one of the speech synthesis function is active or a video clip is played.

Note that the functions of decision block 801 and function block 802 may be omitted or disabled in the event that the headphone and microphone set 400 shown in FIG. 4 is being used. The reason for this is that the possibility of feedback is eliminated by the use of the headphone and microphone set. If these functions are disabled, then additional commands are enabled in the command set as described in more detail below.

Once a voice is detected, a lexical analysis is performed in function block 804. The lexical analysis involves a low level analysis in which sound waves are split into phonemes (i.e., elements of sound) and morphemes (i.e., elements of meaning) in a process of translating the sound waves into words and other elementary segments of meaning (called tokens). The lexical analysis requires some understanding of what words are and the various ways they can be used so that the appropriate words can be recognized. Once this process is complete, a check is made in decision block 805 to determine if a bypass has been set. This will be explained in more detail below. Assuming for now that the bypass has not been set, a command dictionary is accessed in function block 806. A determination is made in decision block 807 as to whether the detected voiced word is recognized as being a command. If so, then the appropriate command function is called in function block 808. After the command function is performed, a return is made to decision block 801. A preferred voiced command set is listed below.

Voiced Command Set

CONTENTS—display table of contents of the book
DISPLAY—display image of completed project
GLOSSARY—display glossary of terms used in the book
INDEX—display index of the book
LIST—list active hyperlinks on current page by displaying a list of hyperlinks and speaking each hyperlink in order or, if no active hyperlinks on current page, returning "no active hyperlinks"
NEXT—go to next page for current recipe or project or return "end" if last page of current recipe or project
PAUSE—pause reading of text or playing of video clip (this command active only if headphone and microphone set 400 are used)
PLAY—play a selected video clip or return "no video clip selected" (this command active only if headphone and microphone set 400 are used)
PRINT—print a displayed recipe, bill of materials, ingredients or the like or return an error message if there is no displayed recipe, bill of materials, ingredients or the like
SHOW—display a recipe, bill of materials, or ingredients for a current project (similar to PRINT)
READ—read displayed text
RETURN—return to last page in LIFO register
SELECT—select a displayed button
SHOW—display a recipe, bill of materials, ingredients for a current project (similar to PRINT)
STOP—stop reading displayed text or playing video clip (this command active only if headphone and microphone set 400 are used)
VIDEO—select a video clip represented by a displayed icon Notice that the voiced command set are all single words. This simplifies the recognition process so that only the lexical analysis of function block 804 is required; that is, it is not necessary to recognize the parts of speech and meaning of a sentence.

Figure 9:
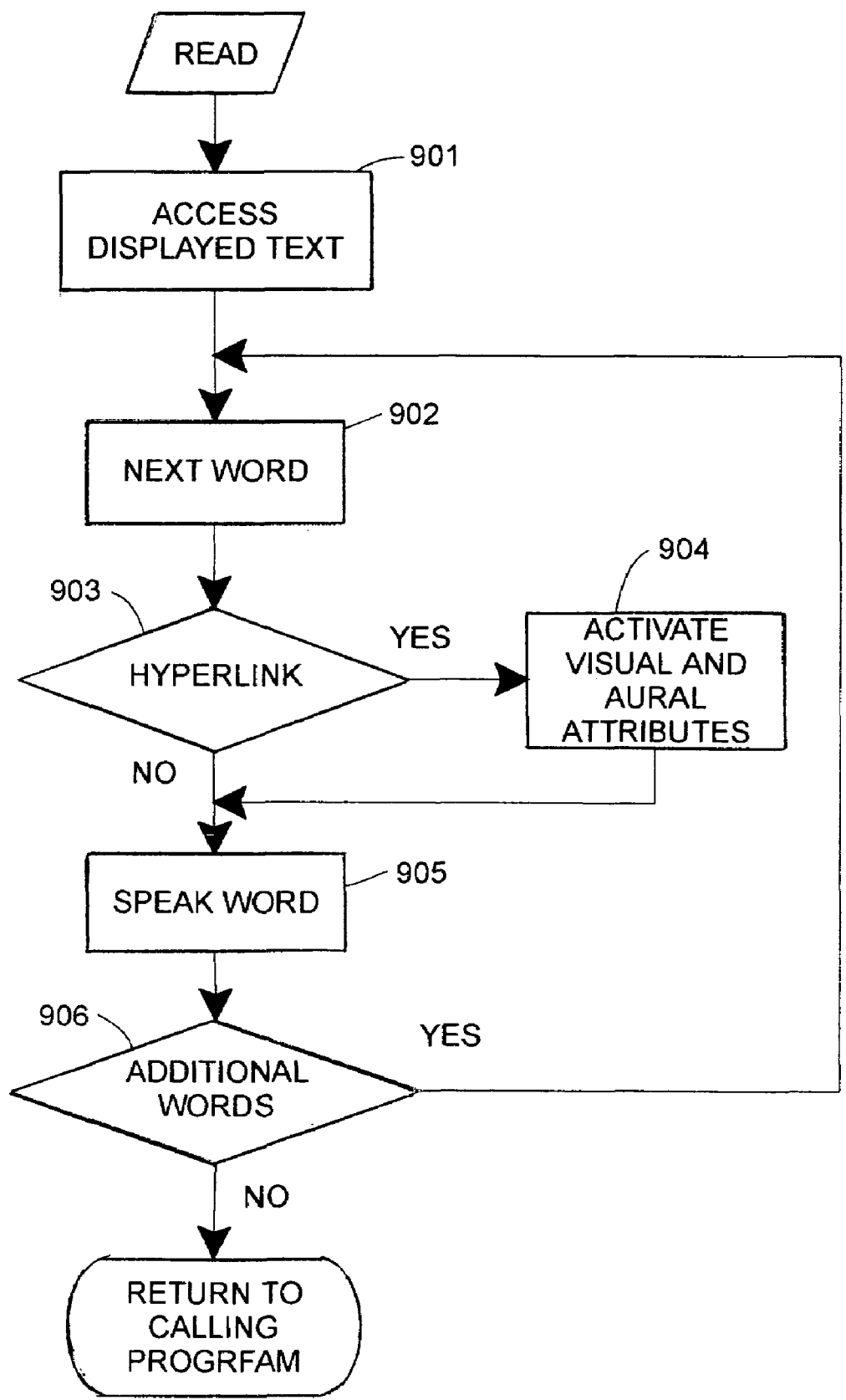
FIG. 9 is a flow diagram illustrating the process of the "READ" command function.

The READ command function is shown in FIG. 9. When this command function is called from the main program, the displayed text is accessed in function block 901, and then a processing loop is entered by accessing the next word in the text in function block 902. For the initial access of the displayed text, the next word will be the first word. A determination is made in decision block 903 as to whether the word is a hyperlink by testing for the hyperlink attributes. If so, the visual and aural hyperlink attributes are activated in function block 904 to alert the user that this word is a hyperlink. Typically, the visual attribute is a change of color but may be other attributes including increasing the brightness, reverse color, flashing or a combination of these and other attributes. The aural attribute may be bell ring or chime, for example. Whether a hyperlink or not, the text-to-speech module of the voice synthesizer speaks the word in function block 905. Then, a determination is made in decision block 906 as to whether there are additional words to be read to the user and, if so, the process loops back to function block 902; otherwise, a return is made to the main program.

Figure 10:
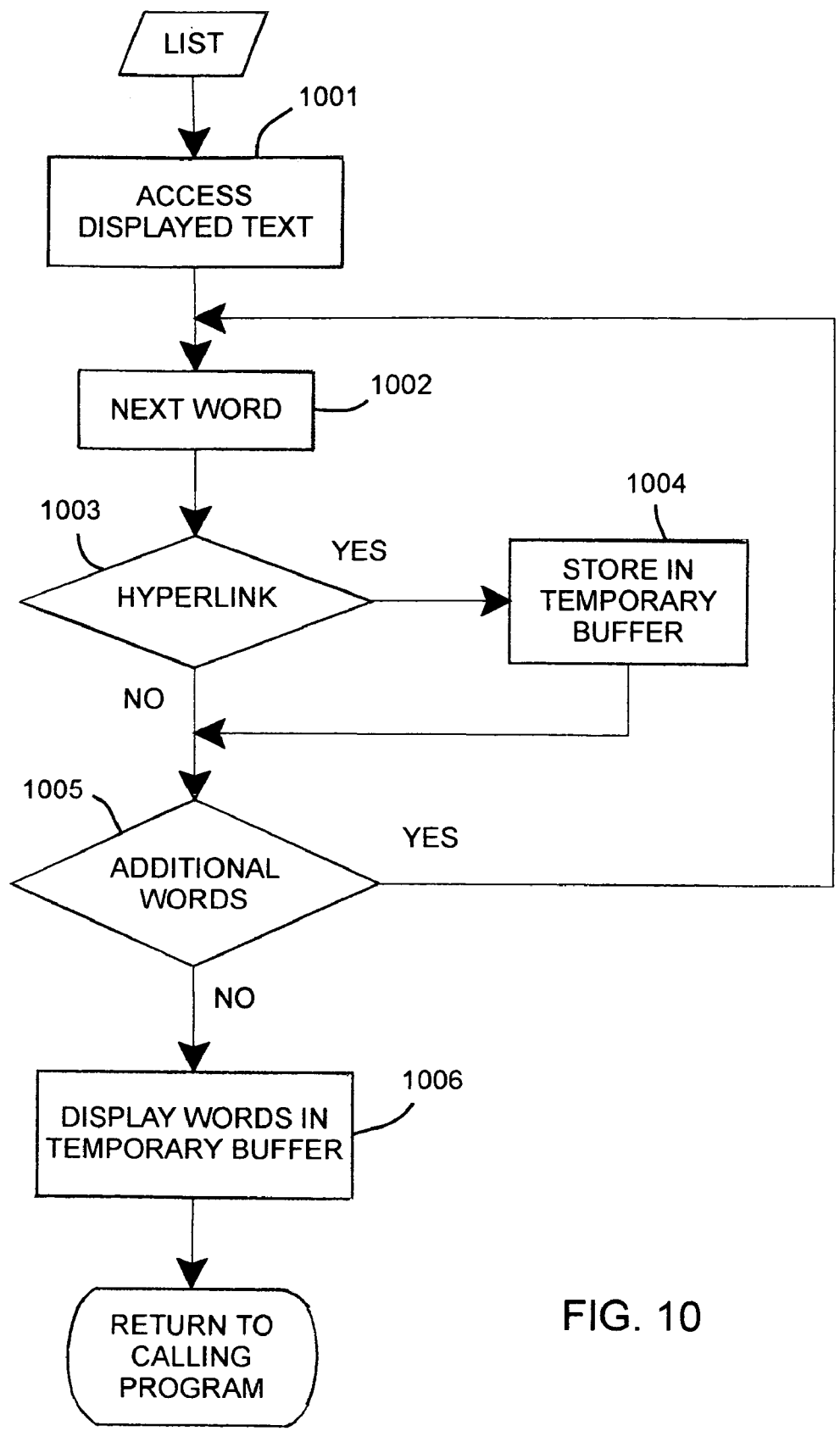
FIG. 10 is a flow diagram illustrating the process of the "LIST" command function.

In the course of the text being read to the user, the user will be made aware of hyperlinks on the current page by the visual and aural attributes. If after the reading of the current page is completed the user is unsure of which words in the text are hyperlinks, the user can invoke the LIST command. The preferred process for the LIST command is shown in FIG. 10. When this command function is called from the main program, the displayed text is accessed in function block 1001, and then a processing loop is entered by accessing the next word in the text in function block 1002. For the initial access of the displayed text, the next word will be the first word. A determination is made in decision block 1003 as to whether the word is a hyperlink by testing for the hyperlink attributes. If so, the word is stored in a temporary buffer in function block 1004. Then, a determination is made in decision block 1005 as to whether there are additional words in the text and, if so, the process loops back to function block 1002; otherwise, the words in the temporary buffer are displayed in function block 1006 for the user to see and, optionally, the words are read in order by the text-to-speech module of the speech synthesizer. While still displaying the listed hyperlinks, a return is made to the main program to await the user's next spoken command.

As an alternative to the LIST command, the user could invoke the SHOW command. The process for this command is essentially the same as that of the READ command, except that instead of reading the text with the text-to-speech module of the voice synthesizer, the visual attribute(s) of the hyperlinks in the text are activated simultaneously and maintained activated for the user to see so that the hyperlinks are viewed in context. Optionally, the hyperlinks can also be read in the order in which they appear in the text by the text-to-speech module of the speech synthesizer. As a simplification of the READ command, the visual attribute(s) of the hyperlinks in the text may be activated upon display of the text and maintained activated while the text is being read. This, however, is not the preferred embodiment.

Figure 8A:
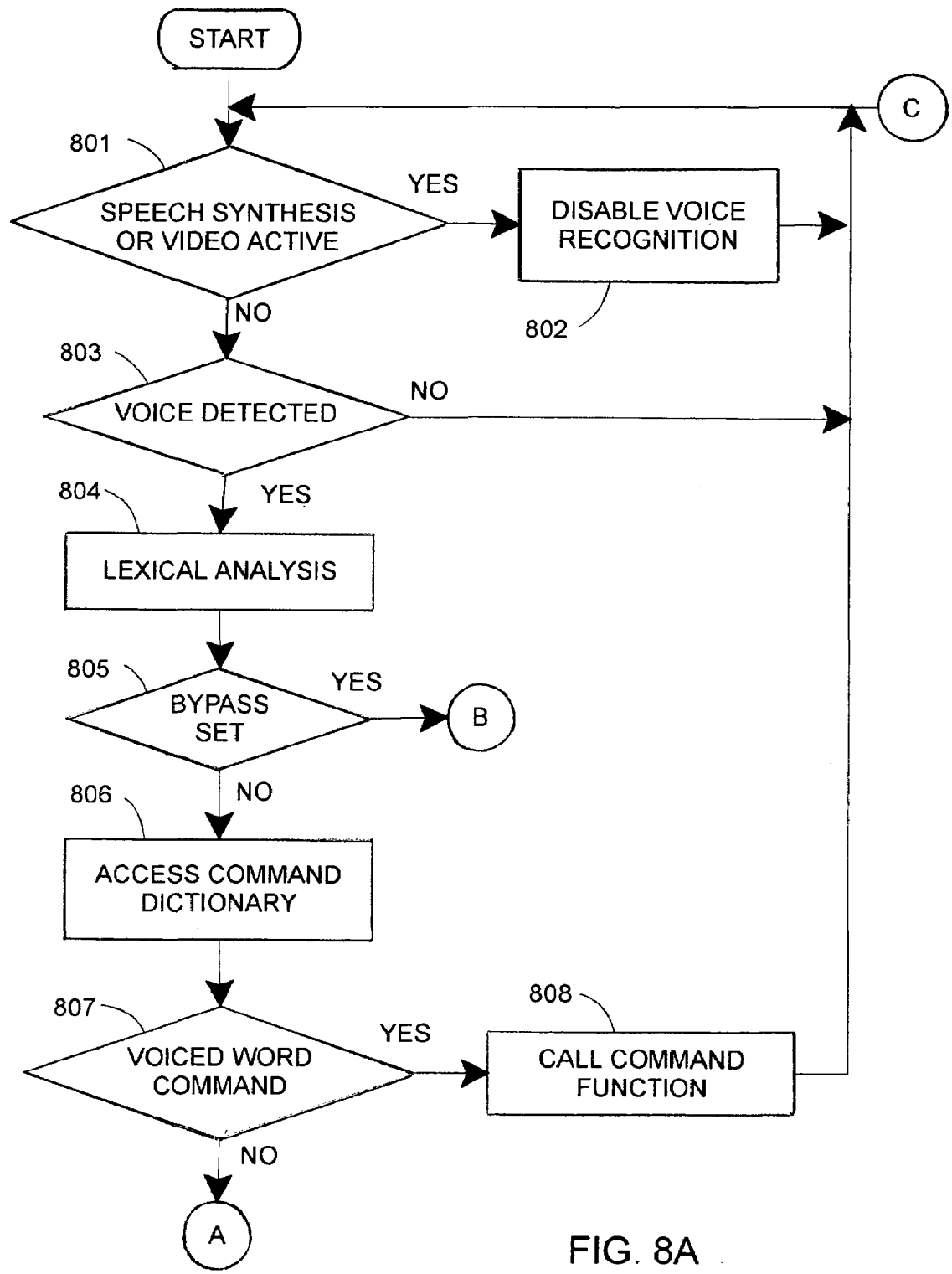
FIGS. 8A, 8B, 8C, 8D, 8E, 8F, and 8G taken together, are a flow diagram illustrating the voice recognition control functions of the interactive multimedia book according to the invention.
Figure 8B:
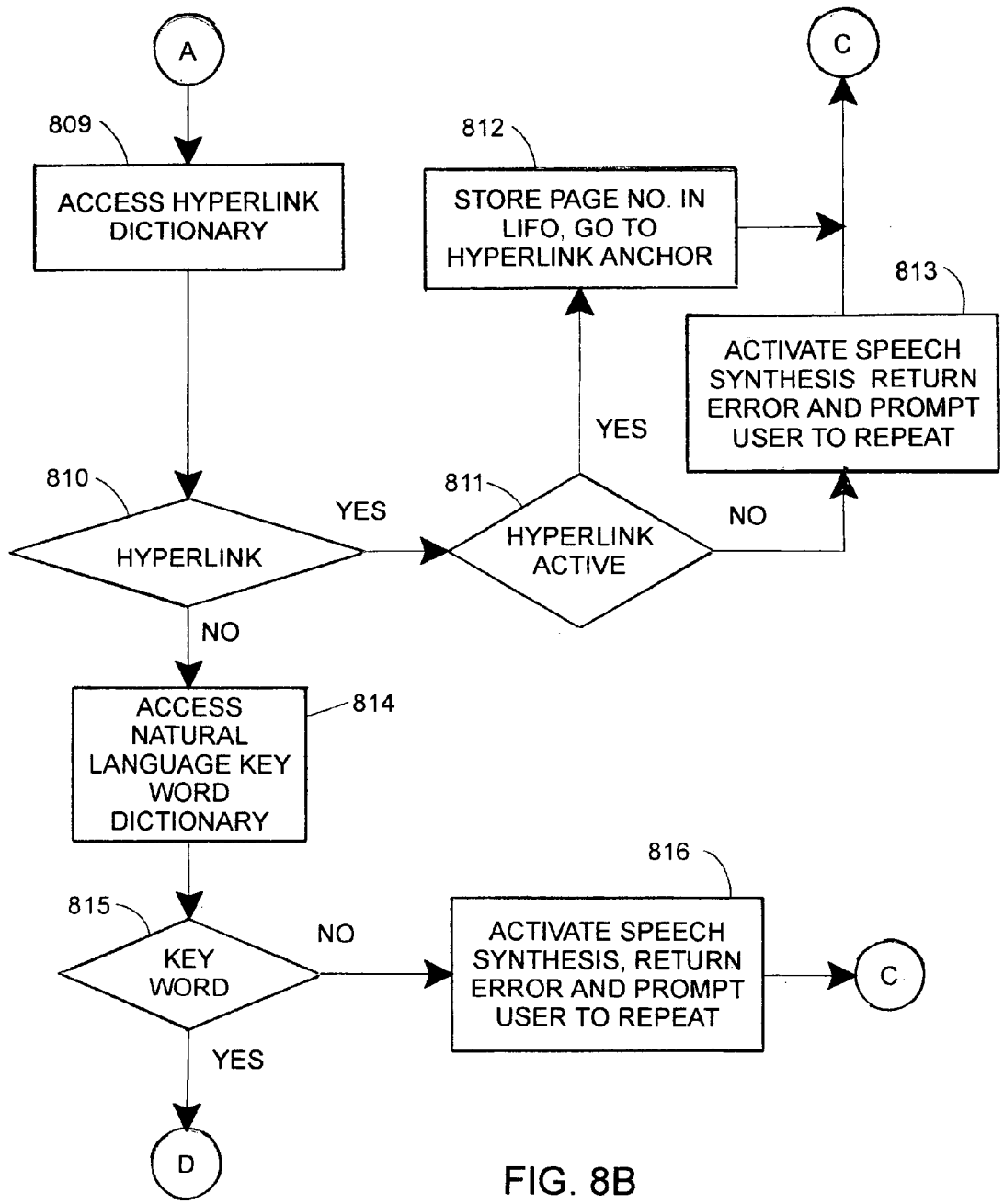

Returning back to FIG. 8A, if a determination is made in decision block 807 that the detected voiced word is not a command, then the process goes to FIG. 8B where a hyperlink dictionary for the book is accessed in function block 809. As in the case of the voiced command set, the hyperlinks are single words; however, the specific hyperlinks will vary from book to book. In other words, the hyperlink dictionary is customized for the specific topic and content of the book. A determination is then made in decision block 810 as to whether the detected voice is recognized as a hyperlink. If a hyperlink for the book is recognized, a further test is made in decision block 811 to determine if the hyperlink is active. A switch to a hyperlink anchor will not be made unless the hyperlink is active; that is, in order for the hyperlink to be active, the detected hyperlink must appear on the currently displayed page. This is necessary to provide the switching context which allows a return to the current page. If the hyperlink is active (that is, on the currently displayed page), then the current page number is saved in a last-in/first-out buffer (LIFO) in function block 812. The book then goes to the page where the hyperlink anchor is located and displays that page. If the hyperlink is not currently active, the speech synthesis function is activated in function block 813 to inform the user that the hyperlink is not currently active and to prompt the user to repeat what was said so that another attempt may be made to recognize the detected voice. The process then loops back to decision block 801 to await the next voice detection.

Figure 11A:
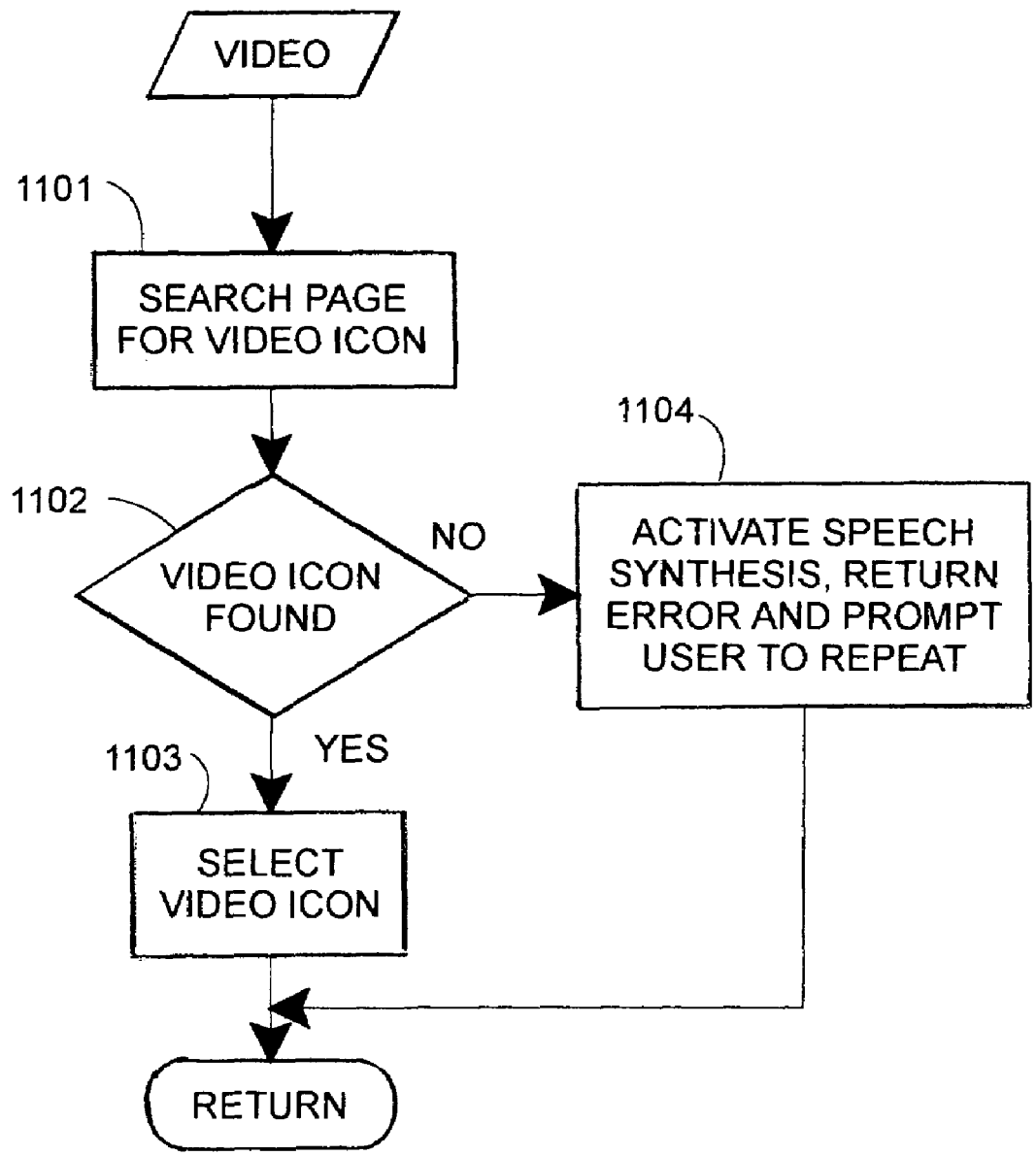
FIGS. 11A and 11B are flow diagram illustrating the processes of the "VIDEO" and "PLAY" command functions.

When the user has activated a hyperlink to a technique in the book, the technique may include a video clip to supplement the text and graphical illustrations. Video clips are indicated by an icon which is displayed adjacent to or imbedded in the text. If the user wants to play the video clip, he or she must first select the video clip icon and then play it. The process is shown in FIG. 11A. When the VIDEO command function is called from the main program, the page is searched in function block 1101 to determine if there is a video icon associated with this page. A determination is made in decision block 1102 to determine if a video icon has been found. If so, the video icon is selected in function block 1103; otherwise, the speech synthesis is activated to tell the user that no video icon is present on the current page and the user is prompted in function block 1104 to repeat the command so that another attempt can be made to detect the command. Then, a return is made to the main program.

Generally, there will be only one video icon, if any, for a page of the book. It is possible to have more than one video icon for a page. If that were the case, the user would be prompted to select among the video icons, and this may be done in any one of several ways. One is to display a menu selection with the first video icon as the default selection. The user would then select the desired video icon using the procedure of FIG. 7B. Alternatively, the names of the video icons may be displayed and the user prompted to speak the name of the video icon to be selected.

Figure 11B:
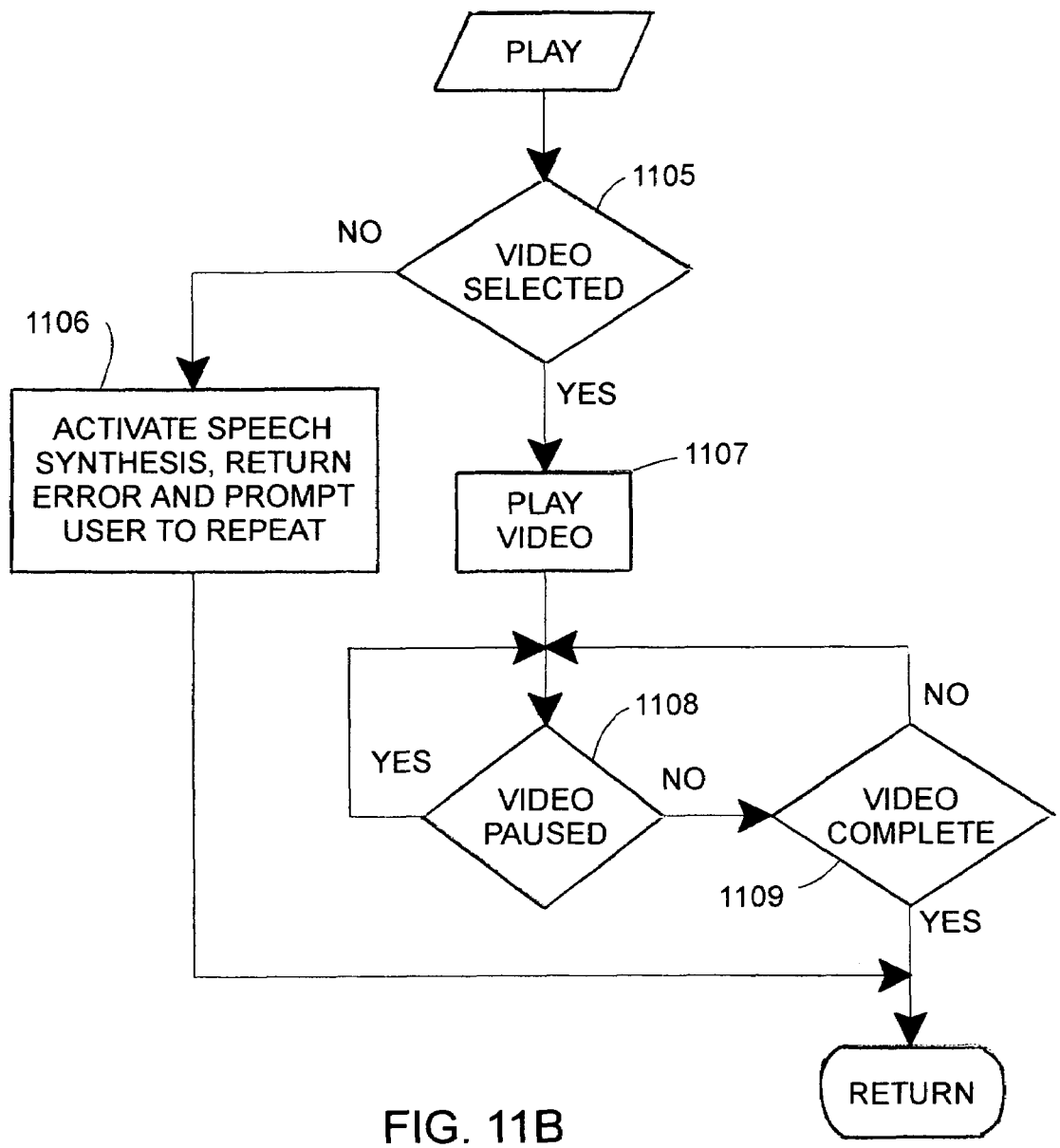

In FIG. 11B, the command "PLAY" is detected and a determination is first made in decision block 1105 as to whether the video icon on the page was first selected by the user (FIG. 11A). If not, the speech synthesis function is activated in function block 1106 to inform the user that he or she must first select the video icon by speaking the command "VIDEO". The user is then prompted to repeat the command so that another attempt can be made to respond. If the video icon was selected as determined in function block 1105, the video clip is played from the beginning in function block 1107. While the video clip is playing, the system monitors the playing of the video clip to determine if the play has been paused in decision blocks 1108. In most applications, the PAUSE command is entered by the user by means of the pause/select button 124 as shown in FIG. 7A. If the user is using the headphone and microphone set 400 shown in FIG. 4, then the commands PAUSE, RESUME and STOP are activated in the voice recognition set. In decision block 1107, a determination is made as to whether the user has input the command PAUSE. If so, the process waits. When the RESUME command is detected, the video clip is resumed at the point it was stopped in response to the PAUSE command. A determination is made in decision block 1109 as whether the playing of the video clip has completed and, if so, the process returns to the main program; otherwise, the process waits. If the STOP command is made by the user (as determined in FIG. 7A, for example), the video clip is stopped and a return is made to the main program. Most video clips will be quite brief, lasting from less than a minute to just a few minutes. Even so, as the user is attempting to perform the illustrated procedure, the user may want to pause the video to "catch up" with the instruction being given.

When the user wants to return the original page, the command "RETURN" is spoken, and the LIFO buffer is accessed to find the original page and make the switch back to that page. It will of course be understood that by "page number", what is meant is any index that may be used by the computer system to identify the current display since physical pages, as in a hard copy book, are not what is displayed. The index used may, however, be correlated to a real page number in a hard copy book if there is a related hard copy book.

By way of example only, the hyperlink LIFO buffer function can be illustrated for a recipe in a cookbook for pound cake. Suppose the recipe suggests a butter cream frosting for the pound cake. The word "butter cream" would appear as a hyperlink on the pound cake recipe page. By speaking the word "butter cream", the current page number is stored in the LIFO buffer and a switch is made to the recipe for butter cream frosting. This recipe, in turn, uses an Italian meringue into which butter is incorporated. The word "meringue" is a hyperlink in the butter cream frosting recipe, and if the user speaks this word, the page number of the butter cream frosting recipe is stored in the LIFO buffer and a switch is made to the recipe for Italian meringue. To take it a step further, the recipe for Italian meringue requires boiling sugar to the softball stage. The word "softball" is a hyperlink in the Italian meringue recipe, and if the user speaks this word, the page number of the Italian meringue recipe is stored in the LIFO buffer and a switch is made to the page of the cook book which describes boiling sugar to the softball stage. Now if the user is ready to go back to the original recipe, the user voices the command "RETURN". However, the LIFO buffer now has three page numbers stored in it. From the page providing directions for boiling sugar to the softball stage, the command "RETURN" will return to the page having the recipe for Italian meringue. A second voiced command "RETURN" will return to the page having the recipe for butter cream frosting, and a third voiced command "RETURN" will return to the page having the recipe for pound cake.

Figure 12:
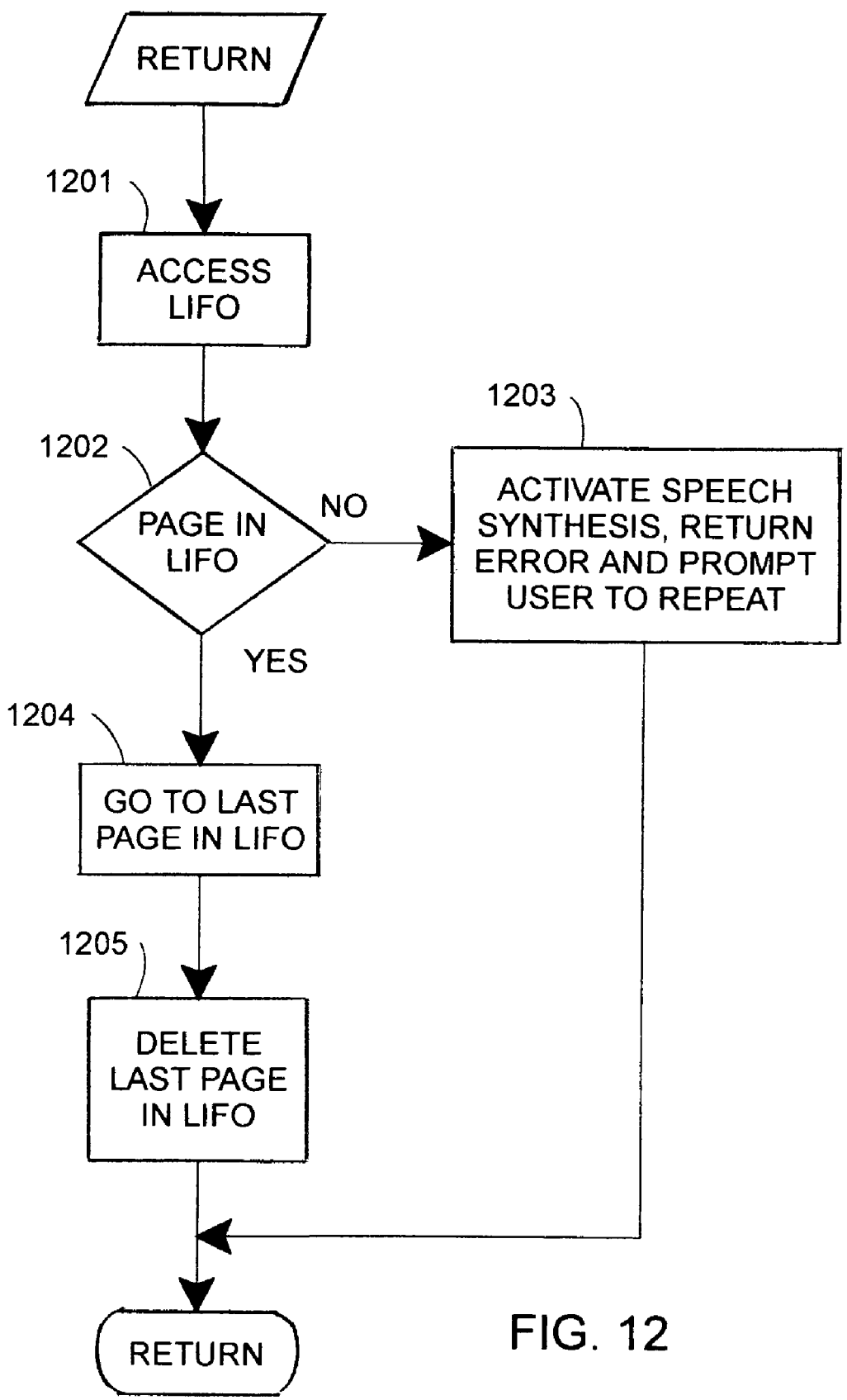
FIG. 12 is a flow diagram illustrating the process of the "RETURN" command function.

The RETURN command process is illustrated in FIG. 12. When this process is entered from the main program, the LIFO buffer is accessed in function block 1201. A determination is made in decision block 1202 as to whether there is a page number stored in the LIFO buffer. If there is not, the speech synthesis function is activated and the user is informed in function block 1203 that there is currently no page to return to and the user is prompted to repeat the command so that another attempt can be made to respond. If there is a page number stored in the LIFO buffer as determined in decision block 1202, a return is made to the last page currently stored in the LIFO buffer in function block 1204. Then, the page to which the return is made is deleted from the LIFO buffer in function block 1205 so that if there are additional pages stored in the LIFO buffer, a return will be made to the next page in order upon the spoken command RETURN being detected again. At this point, a return is made to the main program.

Returning again to FIG. 8B, if it is determined in decision block 810 that the user has not spoken a hyperlink in the hyperlink dictionary for the book, then a natural language key word dictionary is accessed in function block 814. The invention contemplates natural language queries by the user. In the preferred embodiments, a simplified natural language interface is used. Basically, only four key words are recognized in the preferred embodiment. These are "WHAT", "MAKE", "HOW" and "GO", although other key words may be used in modifications to the preferred embodiment. The queries that are recognized are listed in the table below:

Natural Language Queries

"WHAT" is [ ]—process the word or phrase in brackets [ ] and return displayed and spoken definition I want to "MAKE" [ ]—process term or phrase in brackets [ ] and go to requested project or recipe "HOW" do I [ ]—process phrase in brackets [ ] and go to requested technique "GO" to [ ]—go to page number, recipe or project or go to technique voiced by user a. page "[number]"—e.g., "GO TO PAGE 12". Here the page number may be correlated to a hard copy version of the book, and the computer system accesses the corresponding page for display.

b. name of "[recipe or project]"—e.g., "GO TO CHILD'S TABLE"

c. name of "[technique]"—e.g., "GO TO DOVETAIL JOINERY"

A test is made in decision block 815 to determine if the detected word matches one of the key words in the dictionary. If not, the speech synthesis function is activated in function block 816 to inform the user that the voiced word has not been recognized and to prompt the user to repeat what was said so that another attempt may be made to recognize the word. The process then loops back to decision block 801, via connector C, in FIG. 8A to await the next voice detection.

Figure 8C:
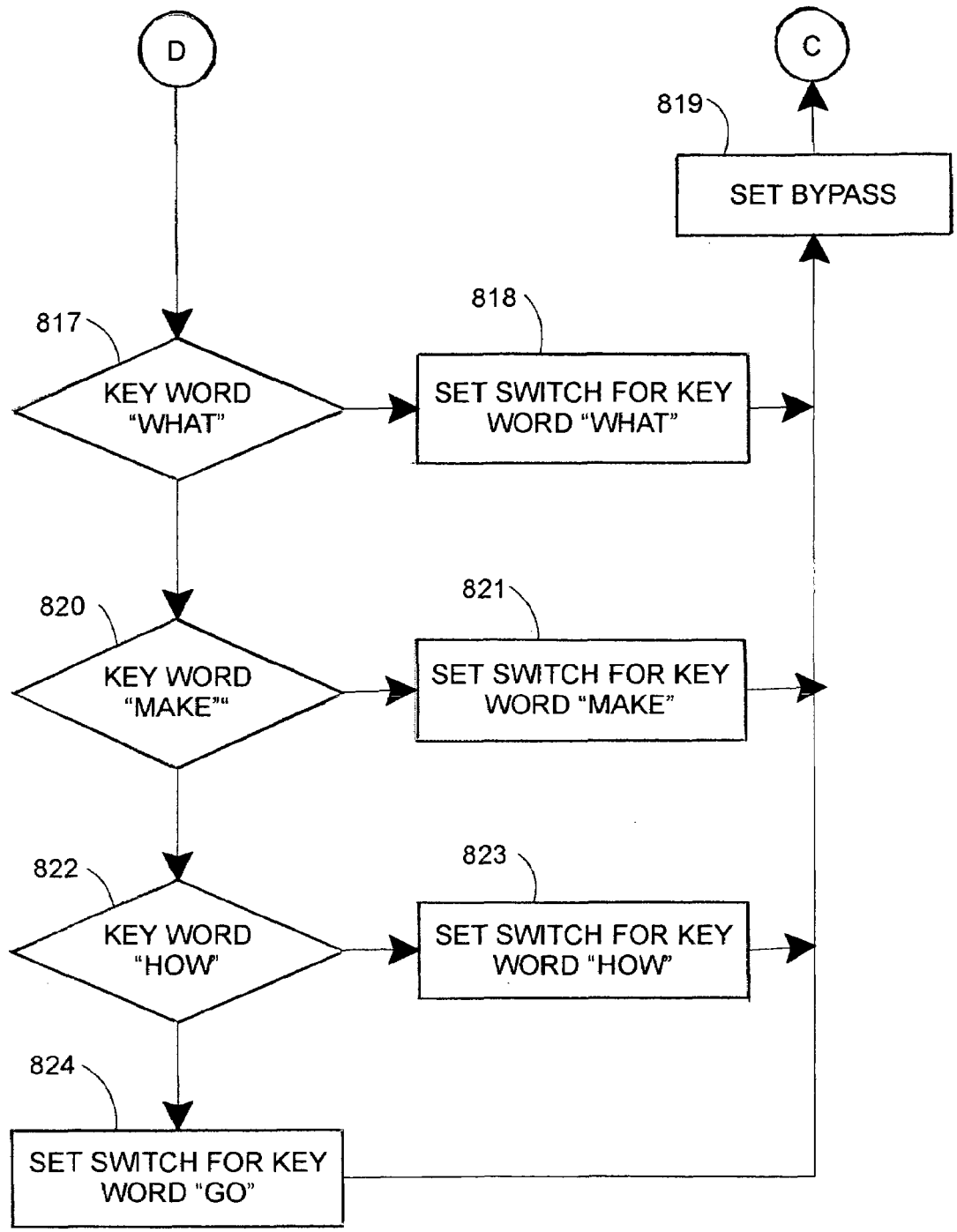
Figure 8D:
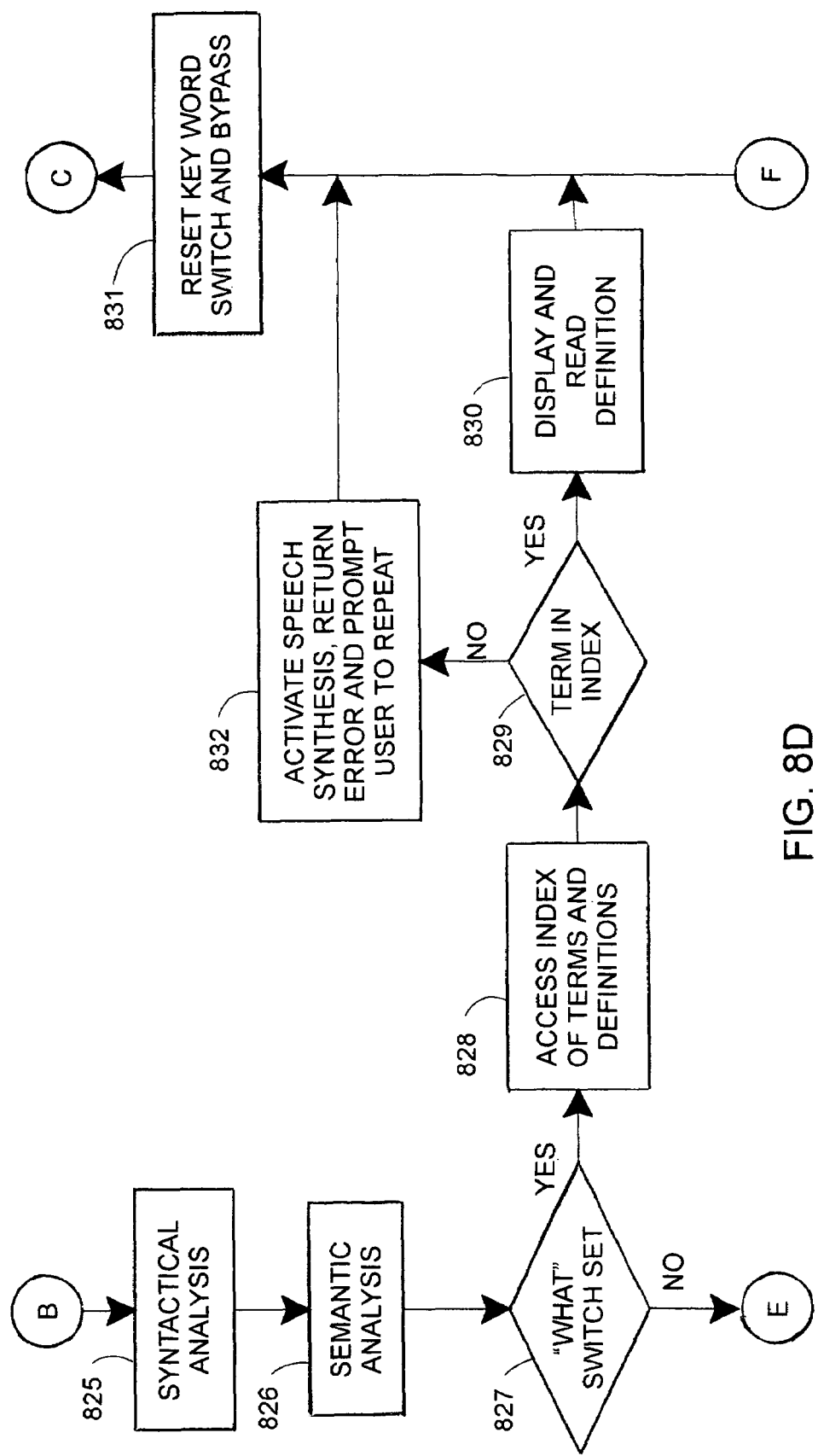

If the detected word is one of the words in the key word dictionary, as determined in decision block 815, then the process goes to FIG. 8C where a determination is made in decision block 817 as to whether the key word "WHAT" is detected, and if so, a switch corresponding to that word is set in function block 818 and the bypass is set in function block 819 before a return is made to decision block 801. If the key word detected is not "WHAT", a determination is made in decision block 820 as to whether the key word detected is "MAKE". If so, a switch corresponding to that word is set in function block 821 and the bypass is set in function block 819 before a return is made to decision block 801. If the key word detected is not "MAKE", as determined in decision block 820, then a determination is made in decision block 822 to determine if the key word is "HOW". If so, a switch corresponding to that word is set in function block 823 and the bypass is set in function block 819 before a return is made to decision block 801. If the key word is not "HOW" as determined in decision block 822, then in this embodiment, the key word must be "GO". A switch corresponding to that word is set in function block 824 and the bypass set in function block 819 before a return is made to decision block 801.

The reason for setting the bypass in function block 819 is so that the next words or phrase will be analyzed for their content in order to determine how to respond to the user's query. When the next words or phrase are detected, the decision block 805 in FIG. 8A will bypass the usual word analysis and instead be passed, via connector B, first to the syntactic analysis in function block 825 in FIG. 8D and then to the semantic analysis in function block 826. Thus, tokens from the lexical analysis in function block 804 in FIG. 8A are analyzed in the syntactic analysis function 825 to determine whether or not they are part of a sentence. A parse tree divides the sentence into parts of speech (i.e., subject, verb, object, etc.). Then the semantic analysis function 826 converts the parse tree to a representation of language that details the meaning of the sentence.

When this analysis is complete, a check is made in decision block 827 to determine if the switch key word "WHAT" was set. If so, an index of terms and definitions is accessed in function block 828, and the sentence output by the semantic analysis function 826 is analyzed by comparing with an index of terms in decision block 829. If a corresponding term is found in the index as determined in decision block 829, then a definition of the word or term in question is displayed and read to the user in function block 830. Optionally, locations within the book where the word or term appears may also be displayed. These locations may be hyperlinks, allowing the user by speaking a hyperlink to go directly to the corresponding location. After the definition is read in function block 830, the key word switches and the bypass switch are reset in function block 831 before a return is made to decision block 801 in FIG. 8A. If a corresponding word or term is not found in the index, as determined in decision block 829, the speech synthesizer is activated in function block 832 to inform the user that the term was not found and to prompt the user to repeat his or her question. Again, the key word switches and the bypass switch are reset in function block 831 before a return is made to decision block 801.

Figure 8E:
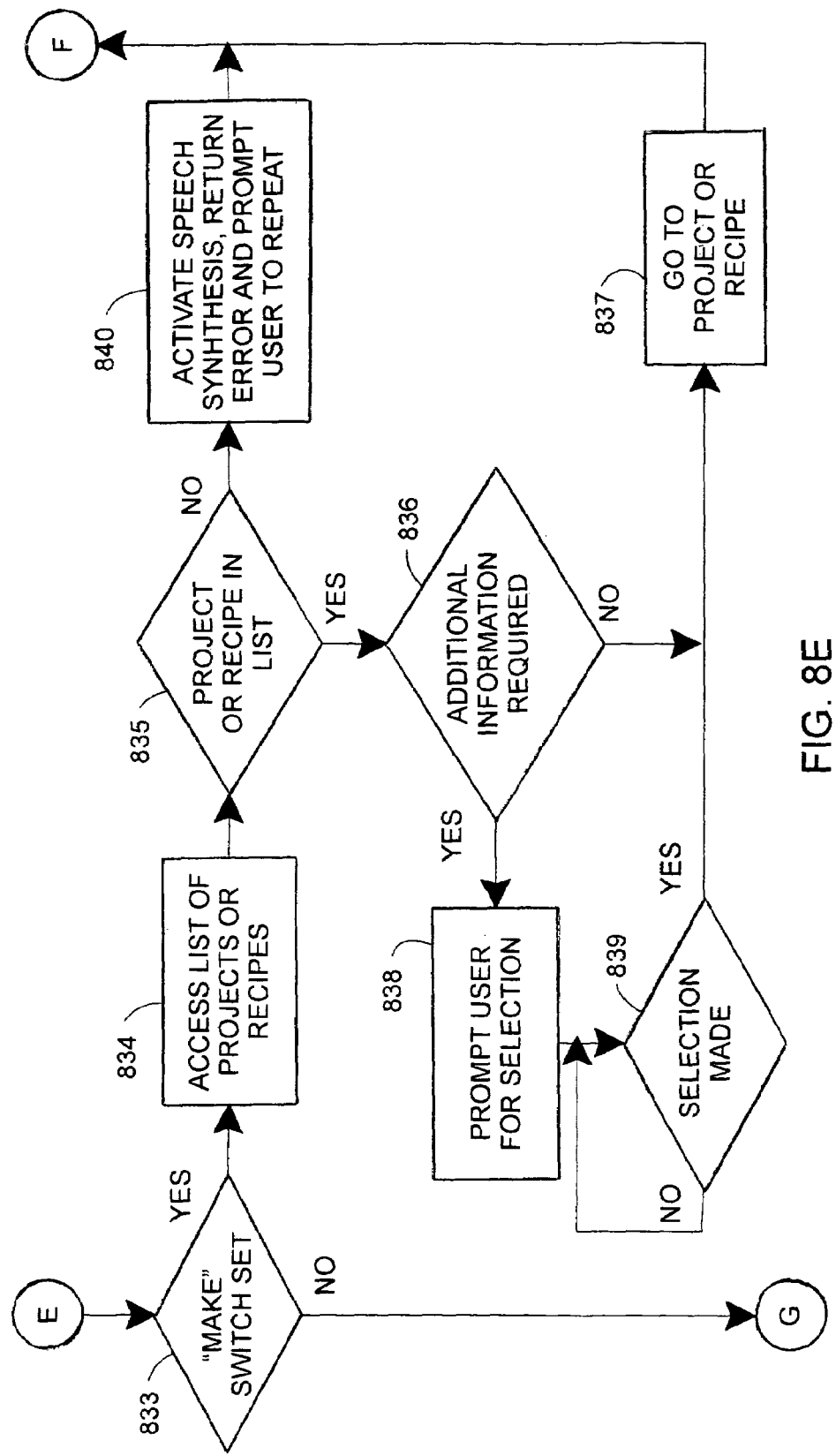

If the query does not include the word "WHAT" as determined in decision block 827, the process goes to FIG. 8E, via connector E, where a test is made in decision block 833 to determine if the key switch for the word "MAKE" was set. This word is interpreted to mean that the user wants to make a particular project or recipe. If the word "MAKE" is detected, the projects or recipes covered in the particular interactive multimedia book are accessed in function block 834. A comparison is made in decision block 835 of the phrase following the word "MAKE" and the projects or recipes covered by the book to determine if the project or recipe requested is covered. If not, the speech synthesis application is activated to return an error and prompt the user to repeat the command in function block 840 before a return is made to FIG. 8D via connector F. If the project or recipe voiced by the user is unambiguous, as determined in function block 836, then the process goes to that section of the book which covers the project or recipe in function block 837. Again, the key word switches and the bypass switch are reset in function block 831 before a return is made to decision block 801.

If more than one project or recipe is found which is covered by the book as determined by decision block 836, then the user is prompted in function block 838 to select which project or recipe he or she wants to make. For example, suppose the user says, "I want to make a cake". There may be several types of cake to choose from and for each type of cake, there may be several recipes. The user may first be prompted in function block 838 to select among sponge or foam cakes, butter cakes, biscuit cakes, custard cakes, and fruit cakes. The prompt may be in the form a speech synthesized prompt to select from among a displayed menu of choices, in which case the user would use the membrane button switch 124 (FIG. 1) to make a selection. Alternatively, after prompting the user to make a selection, a return may be made to decision block 801 without resetting the bypass switch to receive the user's voiced selection. Once the user makes a selection of the type of cake, then the user would be prompted to select from among the recipes for that type of cake in function block 838. In decision block 839, a determination is made as to whether the user has selected a specific project or recipe, and if so, the process goes to that section of the book which covers the project or recipe in function block 837. The key word switches and the bypass switch are reset in function block 831, and the process then loops back to decision block 801.

Figure 8F:
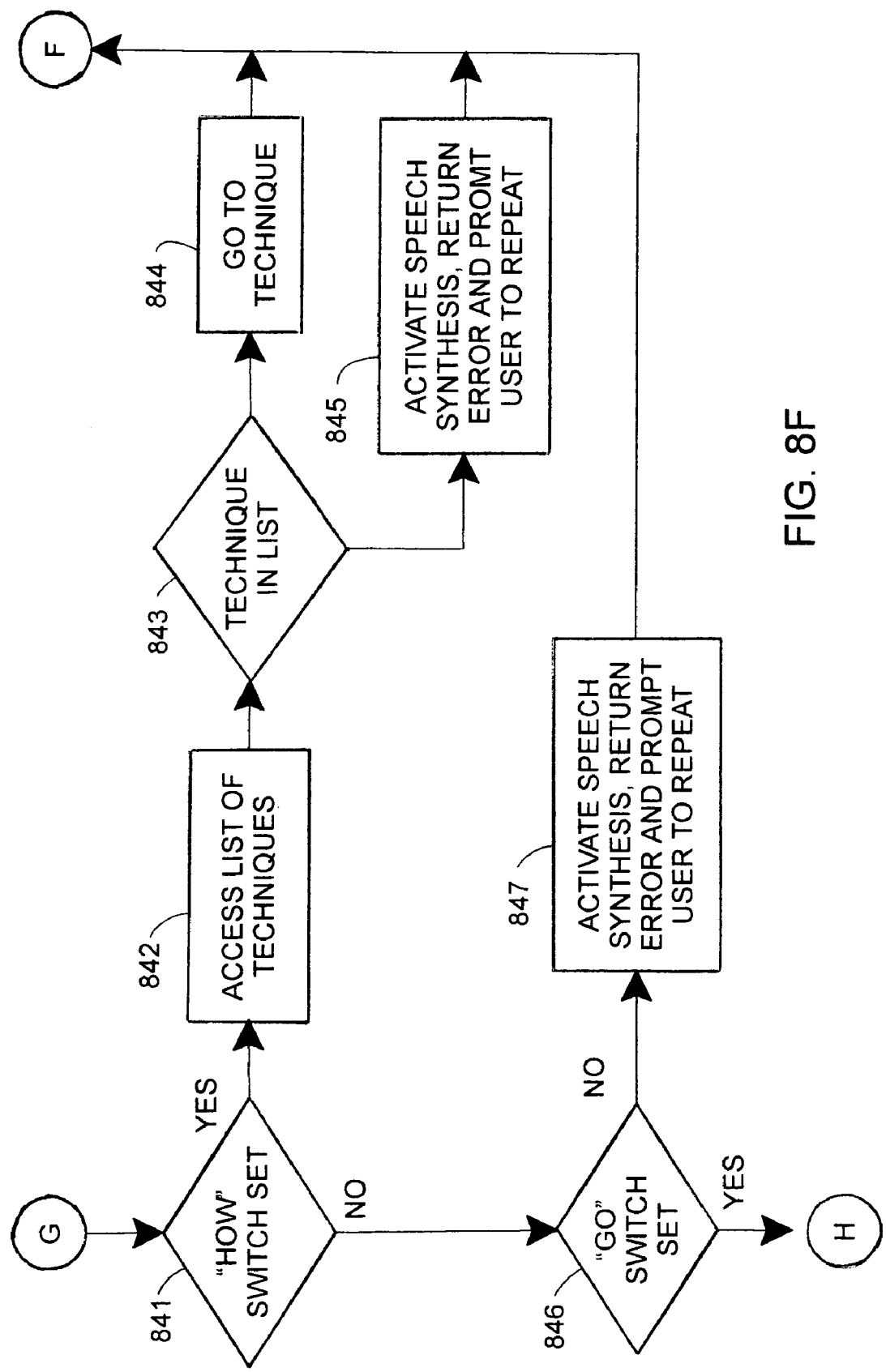

If the key word is not "MAKE" as determined in decision block 833, the process goes to FIG. 8F, via connector G, where a determination is made in decision block 841 as to whether the key word is "HOW". If the query includes the word "HOW", this word is interpreted to mean that the user needs instruction in a particular technique. If the word "HOW" is detected, the techniques covered in the particular interactive multimedia book are accessed in function block 842. A comparison is made in decision block 843 of the phrase following the word "HOW" and the techniques covered by the book to determine if the technique requested is covered. If the technique is covered, the process goes to that section of the multimedia book that covers the technique in function block 844. If not, the speech synthesis function is activated in function block 845 to inform the user that the requested technique is not covered by the book and to prompt the user to ask the question again. In either case, the key word switches and the bypass switch are reset in function block 831 (via connector F), and a return is made to decision block 801.

If the key word is not "HOW" as determined in function block 841 in FIG. 8F, then a test is made in decision block 846 to determine if the switch for the key word is "GO" is set. For this embodiment, there are only four key words and one of the key word switches should be set on detecting a key word in decision block 815 in FIG. 8B. If no key word switch has been set, then there has been an error. Therefore, the speech synthesis function is activated to return an error message to the user in function block 847. The user is also prompted to repeat the query before the key word switches and the bypass switch are reset in function block 831, via connector F, before a return is made to decision block 801 in FIG. 8A.

Figure 8G:
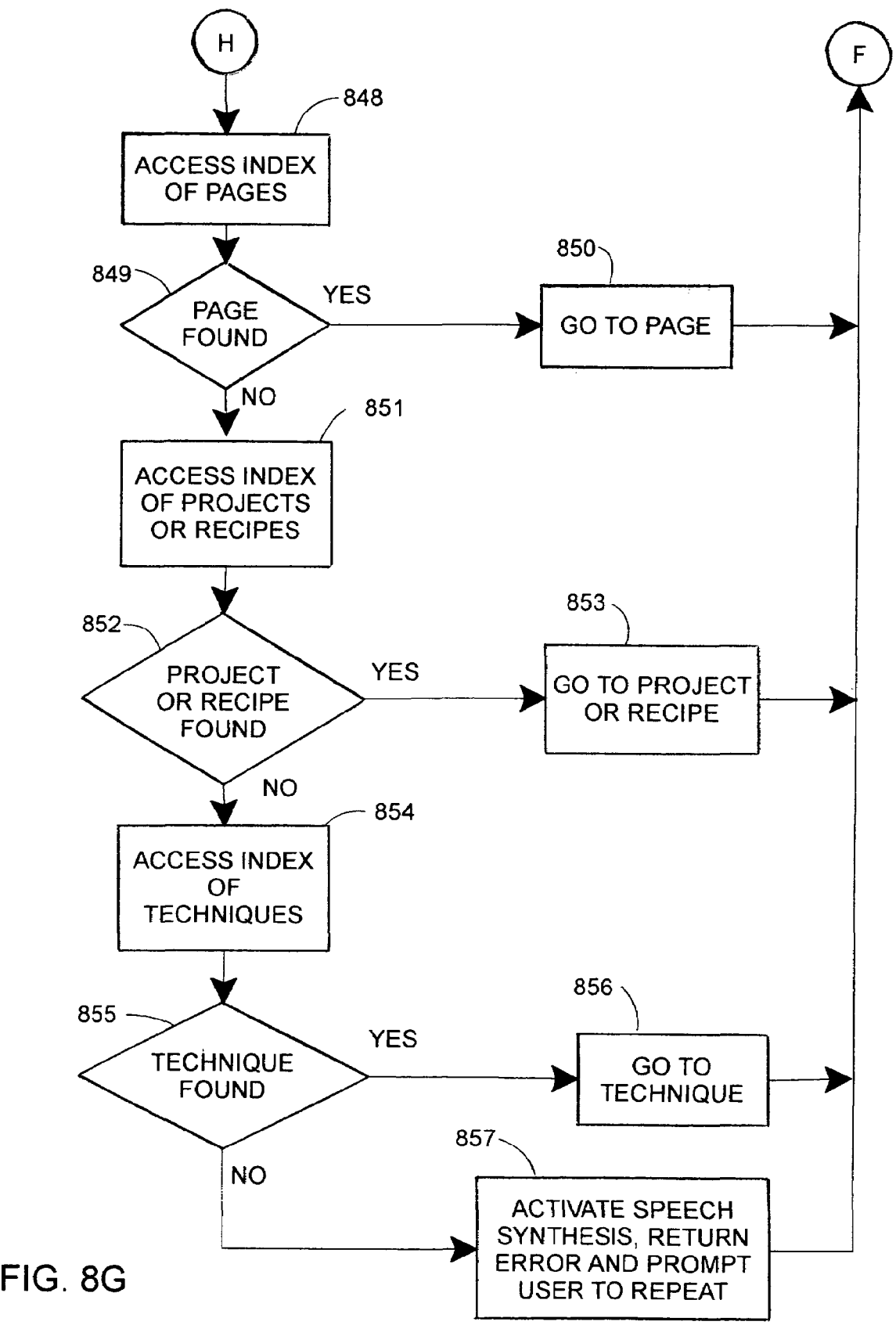

Assuming that the switch for the key word "GO" was properly set, then the process goes to FIG. 8G, via connector H, where an index of pages is first accessed in function block 848. A determination is made in decision block 849 as to whether a page was found corresponding to the query. The user may speak a desired page number corresponding to a hard copy of the book. If so, the process goes to the page in the multimedia book corresponding to the page in the hard copy of the book in function block 850. From there, the process goes to the reset function block 831 (via connector F) before a return is made to decision block 801.

If a page was not found in decision block 849, then an index of projects or recipes is accessed in function block 851. A determination is then made in decision block 852 as to whether a project or recipe was found corresponding to the query. If so, the process goes in function block 853 to that section of the multimedia book which describes the project or recipe. From there, the process goes to the reset function block 831 before a return is made to decision block 801.

If a project or recipe was not found in decision block 852, an index of techniques is accessed in function block 854. A determination is made in decision block 855 as to whether a technique corresponding to the query is found. If so, the process goes in function block 856 to that section of the multimedia book which describes the technique. From there, the process goes to the reset function block 831 before a return is made to decision block 801.

Should no technique be found in decision block 855, an error has occurred. Therefore, in function block 857, the speech synthesis function is activated and an error message is returned with a prompt to the user to repeat his or her query. From there, the process goes to the reset function block 831 before a return is made to decision block 801.

Figure 13:
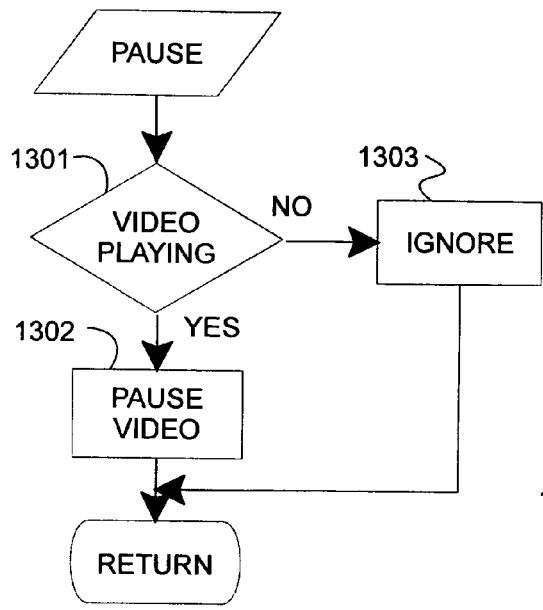
FIGS. 13, 14 and 15 are flow diagrams illustrating, respectively, the processes of the "PAUSE", "RESUME" and "STOP" command functions.
Figure 14:
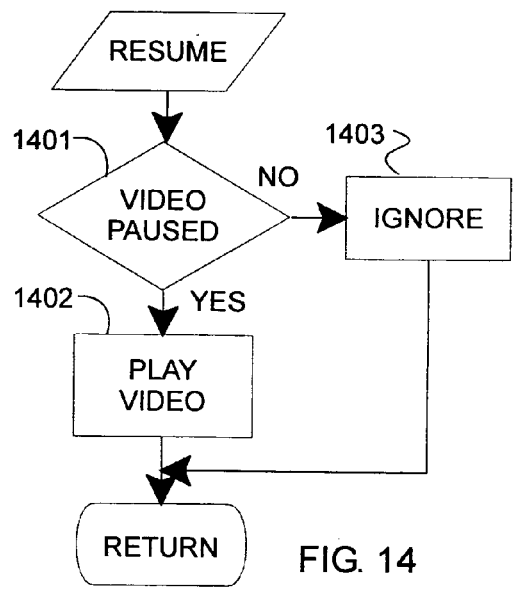
Figure 15:
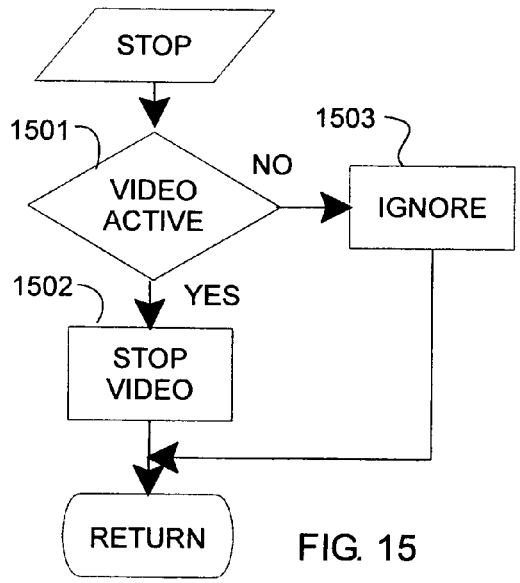

When the headphone and microphone set 400 (FIG. 4) is used, the voiced command set is increased by enabling the commands "PAUSE", "RESUME" and "STOP". The processes of these commands are shown in FIGS. 13, 14 and 15, respectively. Referring first to FIG. 13, when the command "PAUSE" is detected, a determination is made in decision block 1301 as to whether a video is being played. If so, the video is paused in function block 1302; otherwise, the command is ignored in function block 1303. Referring next to FIG. 14, when the command "RESUME" is detected, a determination is made in decision block 1401 as to whether a video is paused. If so, playing of the video is resumed in function block 1402; otherwise, the command is ignored in function block 1403. Finally, referring to FIG. 15, when the command "STOP" is detected, a determination is made in decision block 1501 as to whether a video is active, either being played or paused. If so, the video is stopped in function block 1502; otherwise, the command is ignored in function block 1503.

These and the other commands in the command set are examples of the types of commands that can be used in various embodiments in the practice of the invention. Likewise, other key words than those specifically disclosed to support a natural language interactive interface can be used depending on the specific application. And, of course, the hyperlinks in the text of the interactive multimedia book will vary from book to book depending on the subject matter of the book. In any specific application, the interactive multimedia book according to this invention provides a unique, convenient and very effective vehicle for providing instruction on a variety of subjects. Therefore, while the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A method of presenting an interactive multimedia book on a computer system comprising the steps of:
   recognizing a voiced word spoken by the user of the book as an active hyperlink;
   responding to a voiced word which is an active hyperlink by first storing a current page number in a last in, first out register before moving to a second page of the book which contains an anchor for the hyperlink, the current page being an origin page, and then moving to said second page of the book which contains the anchor for the hyperlink;
   recognizing a voiced command spoken by the user of the book to return to the origin page;
   responding to the voiced command to return to the origin page by moving back to the origin page; and
   deleting the origin page from the last in, first out register after moving back to the origin page.

2. The method of presenting an interactive multimedia book on a computer system recited in claim 1, further comprising the steps of:
   recognizing a natural language query spoken by the user of the book;
   analyzing the natural language query; and
   responding to the natural language query.

3. A method of presenting an interactive multimedia book on a computer system comprising the steps of:
   generating a multimedia book as a digital file containing text, images, graphics and video clips;
   displaying a simulated page of the multimedia book to a user of the book, a simulated page containing at least one of said text, images, graphics and video clips and selected pages containing one or more active hyperlinks pointing to a corresponding anchor located on a different simulated page;
   recognizing a voiced word spoken by the user of the book as an active hyperlink;
   responding to a voiced word spoken by the user of the book as an active hyperlink of a currently displayed simulated page by first storing the current page number in a last in, first out register before moving to a second page of the book which contains the anchor for the hyperlink, the current page being an origin page, and then moving to said second page of the book which contains the anchor for the hyperlink;
   recognizing a voiced command spoken by the user of the book to return to the origin page; and
   responding to the voiced command to return to the origin page by accessing the last in, first out register to determine the origin page and moving back to the origin page.

4. The method of presenting an interactive multimedia book on a computer system as recited in claim 3, further comprising the step of deleting the origin page in the last in, first out register after moving back to the origin page.

5. The method of presenting an interactive multimedia book on a computer system recited in claim 3, wherein while the second page is displayed further comprising the steps of:
   recognizing a voiced word spoken by the user of the book as an active hyperlink on said second page;
   responding to a voiced word which is an active hyperlink on said second page by first storing the second page number in said last in, first register before moving to a third page of the book which contains an anchor for the hyperlink on said second page, then moving to said third page of the book which contains the anchor for the hyperlink on said second page;
   recognizing a voiced command spoken by the user of the book to return to the second page; and
   responding to the voiced command to return to the second page by moving back to the second page.

6. The method of presenting an interactive multimedia book on a computer system as recited in claim 5, comprising the step of deleting the second page in the last in, first out register after moving back to the second page.

7. The method of presenting an interactive multimedia book on a computer system as recited in claim 6, further comprising the steps of:
   recognizing a voiced command spoken by the user of the book to return to the origin page;
   responding to the voiced command to return to the second page by moving back to the second page; and
   deleting the origin page in the last in, first out register after moving back to the origin page.

8. The method of presenting an interactive multimedia book on a computer system recited in claim 3, wherein while the second page is displayed further comprising the steps of:
   recognizing a voiced word spoken by the user of the book;
   determining if the voiced word spoken by the user is a command; and
   if the voiced word spoken by the user is a command, executing the command.

9. The method of presenting an interactive multimedia book on a computer system recited in claim 8, wherein the second page contains a video clip and the voiced command is "PLAY", further comprising the step of playing the video clip.

10. The method of presenting an interactive multimedia book on a computer system recited in claim 9, wherein while the video clip is playing further comprising the steps of:
   recognizing a voiced word spoken by the user of the book;
   determining if the voiced word is one of the commands "PAUSE" or "STOP"; and
   if the voiced word is the command "PAUSE", pausing the playing of the video clip; but
   if the voiced word is the command "STOP", stopping the playing of the video clip.

11. The method of presenting an interactive multimedia book on a computer system recited in claim 10, wherein while the video clip is paused further comprising the steps of:
   recognizing a voiced word spoken by the user of the book;
   determining if the voiced word is the command "RESUME"; and
   if the voiced word is the command "RESUME", resuming playing of the video clip from a point where the video clip was paused.

* * * * *